US011755158B2

(12) United States Patent
McFarland

(10) Patent No.: US 11,755,158 B2
(45) Date of Patent: Sep. 12, 2023

(54) CAPACITIVE TOUCH SURFACE

(71) Applicant: CFA Properties, Inc., Wilmington, DE (US)

(72) Inventor: Nathaniel McFarland, Mableton, GA (US)

(73) Assignee: CFA Properties, Inc., Atlanta, GA (US)

( * ) Notice: Subject to any disclaimer, the term of this patent is extended or adjusted under 35 U.S.C. 154(b) by 0 days.

(21) Appl. No.: 17/199,035

(22) Filed: Mar. 11, 2021

(65) Prior Publication Data

US 2021/0286474 A1 Sep. 16, 2021

Related U.S. Application Data

(60) Provisional application No. 62/988,099, filed on Mar. 11, 2020.

(51) Int. Cl.
*G06F 3/044* (2006.01)
*G06F 3/041* (2006.01)

(52) U.S. Cl.
CPC .......... *G06F 3/0446* (2019.05); *G06F 3/0416* (2013.01); *G06F 3/0447* (2019.05)

(58) Field of Classification Search
CPC ..... G06F 3/0446; G06F 3/0416; G06F 3/0447
See application file for complete search history.

(56) References Cited

U.S. PATENT DOCUMENTS

| | | | | |
|---|---|---|---|---|
| 8,658,917 B2* | 2/2014 | Westhues | ............ | G06F 3/04886 345/173 |
| 8,668,626 B1* | 3/2014 | Horowitz | ........... | A63B 71/0605 482/37 |
| 8,808,145 B1* | 8/2014 | Parsons | ................ | G06F 16/958 482/37 |
| 9,795,851 B2* | 10/2017 | Tsang | ................. | A63B 24/0003 |
| 11,173,366 B2* | 11/2021 | Garnier | ............. | A63B 24/0062 |
| 2007/0040330 A1* | 2/2007 | Robinson | ................. | A63F 3/02 273/243 |
| 2010/0302205 A1* | 12/2010 | Noma | ................... | G06F 3/0446 345/174 |
| 2010/0331083 A1* | 12/2010 | Maharbiz | ............ | A63F 3/00003 273/237 |

(Continued)

OTHER PUBLICATIONS

"Ligalux—Wall of Sound," fischerAppelt, Dec. 11, 2017, (1 page), YouTube, [Retrieved from the Internet Apr. 6, 2023] <URL: https://www.youtube.com/watch?v=Z_GWqF7aVrs&t=43s>.

(Continued)

*Primary Examiner* — Liliana Cerullo
(74) *Attorney, Agent, or Firm* — Alston & Bird LLP

(57) ABSTRACT

A touch-capacitive surface system can include a plurality of touch surfaces positioned along a target body. Each of the plurality of touch surfaces can include a capacitive surface. A touch controller electrically can couple to each of the plurality of touch surfaces. The touch controller can detect a touch from a particular touch surface of the plurality of touch surfaces. The system can include a project source and at least one computing device in communication with the touch controller and the projection source. The at least one computing device can generate, via the projection source, projected content at least partially onto the target body in response to the touch controller detecting the touch from the particular touch surface.

18 Claims, 9 Drawing Sheets

(56) References Cited

U.S. PATENT DOCUMENTS

| | | | | |
|---|---|---|---|---|
| 2011/0204564 | A1* | 8/2011 | Chen | A63F 3/00643 273/237 |
| 2013/0265731 | A1* | 10/2013 | Holma | H05K 1/181 29/830 |
| 2015/0057776 | A1* | 2/2015 | Skjaerseth | A63B 71/0616 700/91 |
| 2019/0243480 | A1* | 8/2019 | Sample | G06F 3/044 |
| 2020/0023257 | A1* | 1/2020 | Speed | A63B 24/0075 |
| 2020/0183521 | A1* | 6/2020 | Mayumi | G06F 3/0412 |

OTHER PUBLICATIONS

"Making of Storywall," Mustard Post Production, Nov. 5, 2018, (1 page), YouTube, [Retrieved from the Internet Apr. 6, 2023] <URL: https://www.youtube.com/watch?v=6ZfpJlwZx7g&t=17s>.

"An Impressive Projection-Mapping Installation With The Interactive Wall Kit," Bare Conductive, Jul. 1, 2019, (4 pages), [Retrieved from the Internet Apr. 6, 2023] <URL: https://www.bareconductive.com/blogs/blog/an-impressive-projection-mapping-installation-with-the-interactive-wall-kit?_pos=16&_sid=11356c8b4&_ss=>.

"Interactive Wall Kit: Get Started," Bare Conductive, (8 pages), [Retrieved from the Internet Apr. 6, 2023] <URL: https://www.bareconductive.com/pages/interactive-wall-kit-get-started>.

"Interactive Wall Kit: Guide," Bare Conductive, (2 pages), [Retrieved from the Internet Apr. 6, 2023] <URL: https://cdn.shopify.com/s/files/1/0520/3669/8292/files/IWK_guide.pdf>.

"Interactive Wall Kit: Instructions," Bare Conductive (10 pages), [Retrieved from the Internet Apr. 6, 2023] <URL: https://cdn.shopify.com/s/files/1/0520/3669/8292/fdes/IWK_instructions.pdf>.

"Vitamin—Creating an Interactive Wall for a Car Company," Bare Conductive, Jul. 27, 2017, (2 pages), [Retrieved from the Internet Apr. 5, 2023] <URL: https://www.bareconductive.com/blogs/community/vitamin-creating-an-interactive-wall-for-a-car-company>.

* cited by examiner

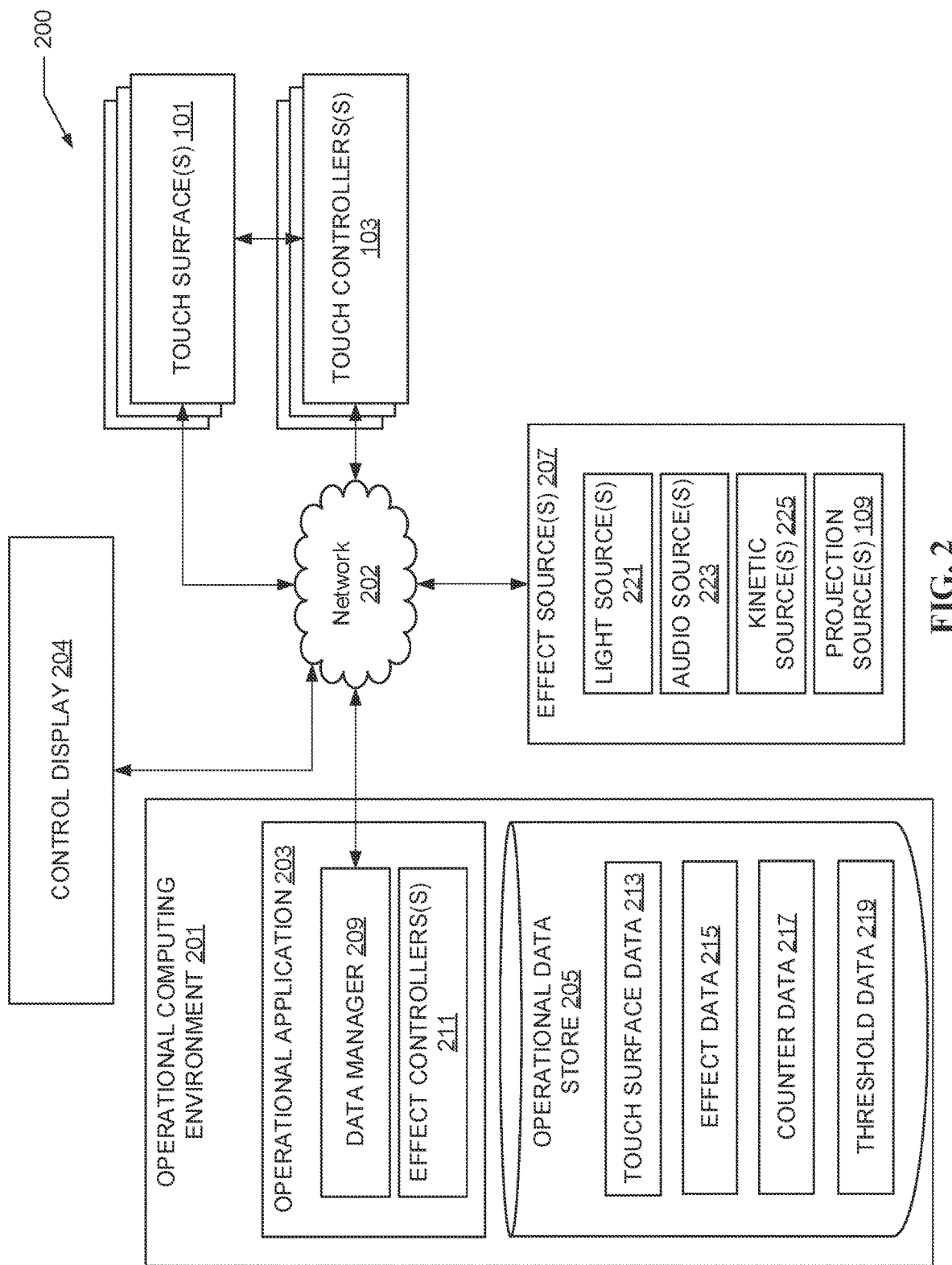

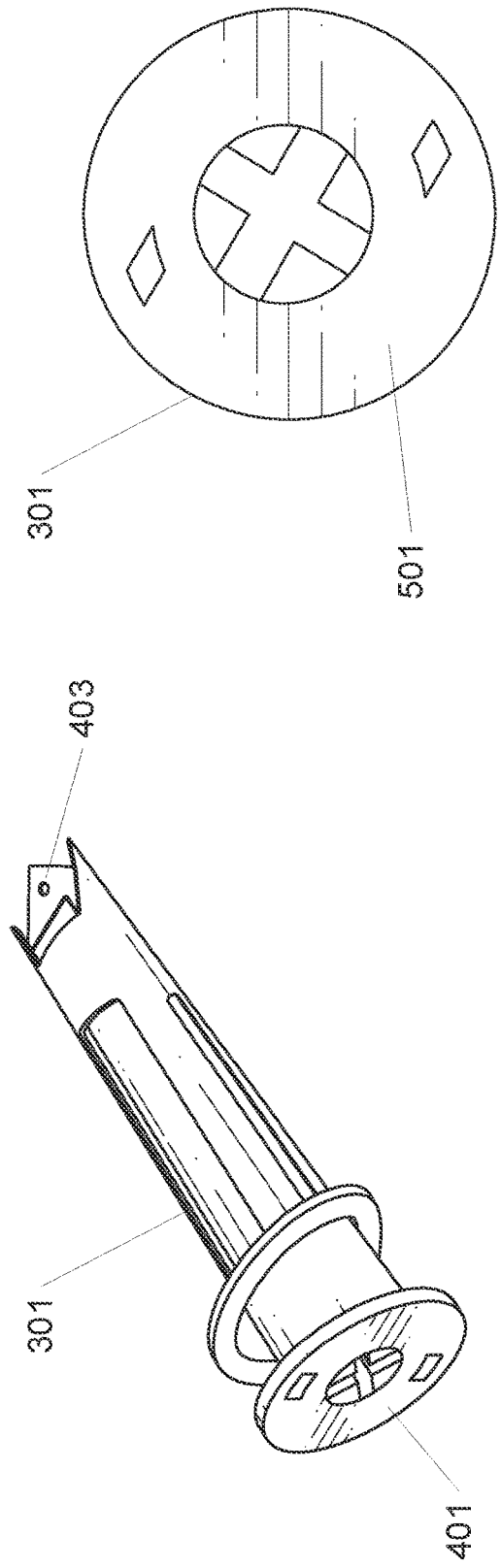
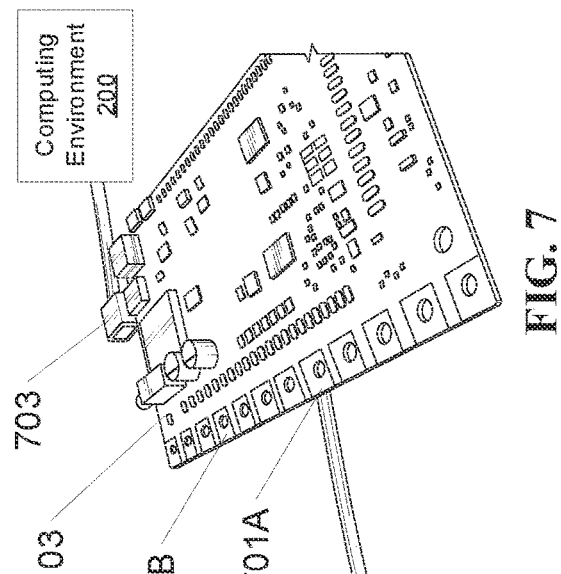
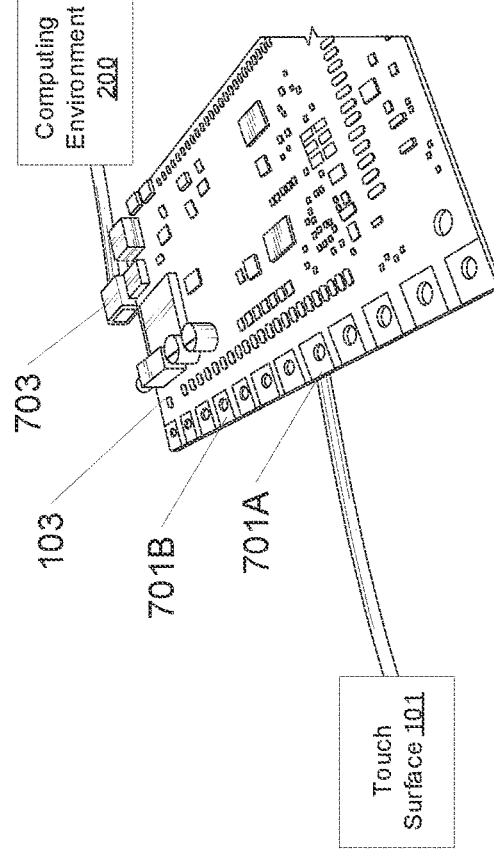
FIG. 4
FIG. 5
FIG. 6
FIG. 7

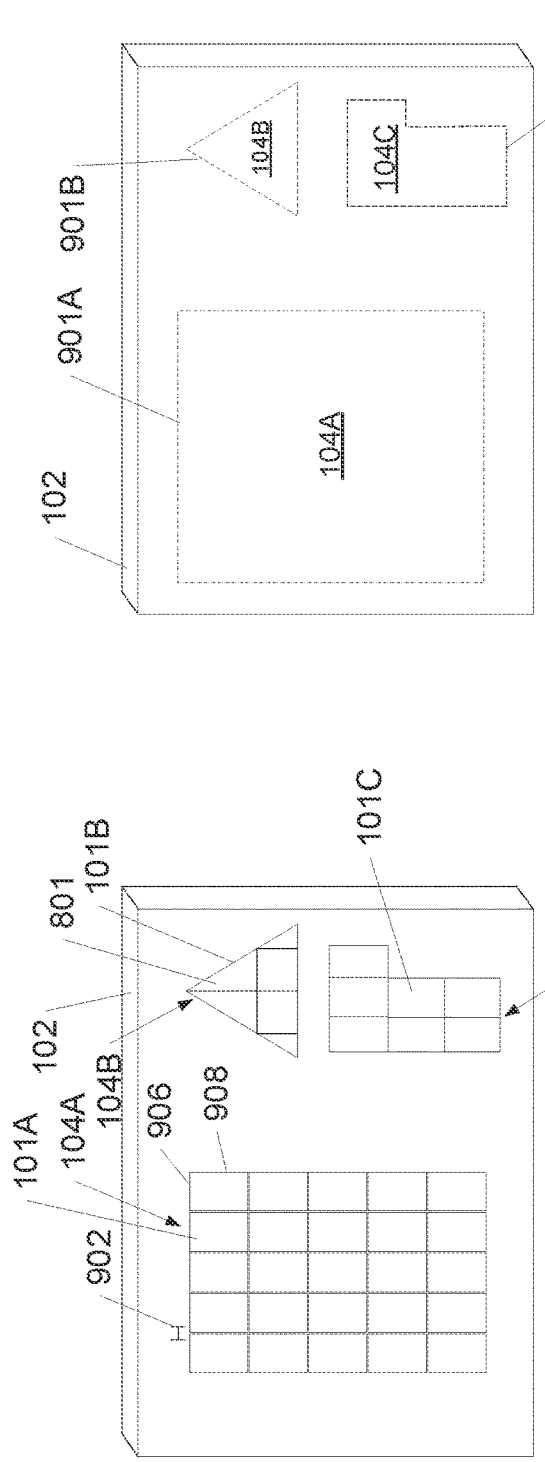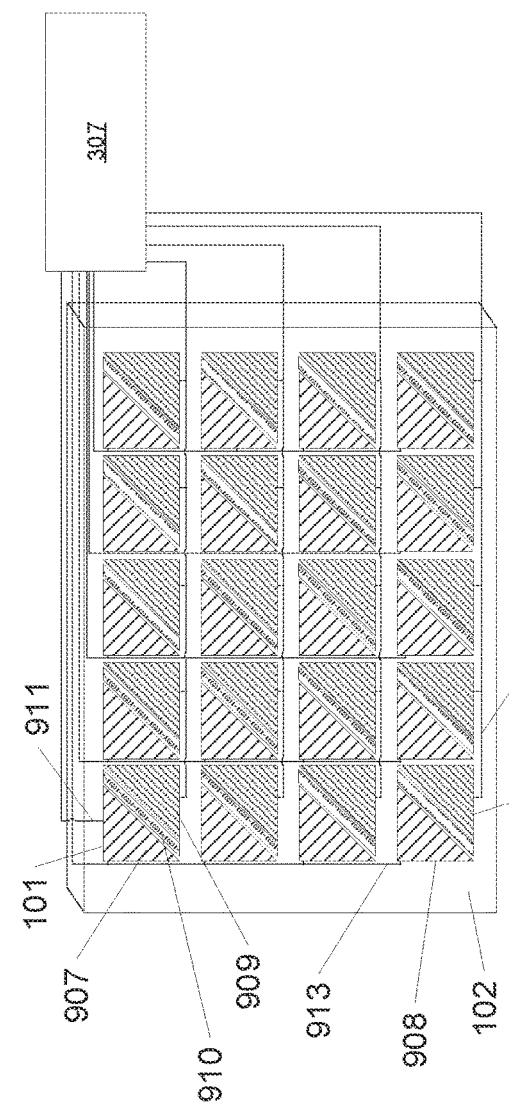

CAPACITIVE TOUCH SURFACE

CROSS REFERENCE TO RELATED APPLICATIONS

This application claims the benefit of and priority to U.S. Patent Application No. 62/988,099, filed Mar. 11, 2020, entitled "CAPACITIVE TOUCH SURFACE," which is incorporated herein by reference in its entirety.

TECHNICAL FIELD

Briefly described, and according to one embodiment, aspects of the present disclosure generally relate to systems and methods for making and using capacitive touch surfaces.

BACKGROUND

Previous approaches to capacitive touch surfaces typically rely on touch-sensitive circuits built into glass panels, such as, for example, liquid crystal display (LCD) or organic light-emitting diode (OLED) panels; however, such approaches typically restrict a shape and form factor of the capacitive touch surface. For example, fabrication of an irregularly shaped touch surface may be infeasible due to costs associated with adjusting upstream production parameters or impossible due to structural limitations of panel materials. As another example, production of large touch capacitive surfaces, such as wall-sized surfaces, can be infeasible in previous approaches due to excessive cost and complexities incurred to fabricate, deliver, install, and maintain large electronic panels. In addition, previous capacitive touch surfaces are typically vulnerable to impacts and hard strikes, which may render such systems unsuitable for impact-prevalent environments, such as playgrounds and other play environments.

Therefore, there exists a long-felt but unresolved need for resilient, scalable, and customizable capacitive touch systems.

BRIEF SUMMARY

Briefly described, and according to one embodiment, aspects of the present disclosure generally relate to an interactive, trigger-able capacitive touch surface system that allows for initiation and manipulation of various effects, such as projections, sounds, and lights, in response to detection of touch inputs to one or more capacitive touch surfaces.

In various embodiments, the system includes a physical environment (e.g., such as a play area) that contains one or more capacitive touch surfaces, and one or more effect sources (e.g., projectors, light elements, audio elements, kinetic elements, etc.) that may be triggered in response to detection of touch inputs to the one or more capacitive touch surfaces. Each of the one or more capacitive touch surfaces can include a sensing surface for receiving touch input and a transmitting element for transmitting a signal responsive to the touch input to one or more touch controllers, effect controllers and/or to a central computing environment. The system can include subjects (for example, children) that provide touch input to the one or more capacitive touch surfaces, for example, by placing a finger or hand thereon. Upon receipt of a touch input, a touch controller can transmit a touch signal including a touch surface identifier to a central computing environment. Upon receiving and processing the touch signal, one or more effect controllers of the central computing environment can cause one or more effect sources to activate and generate a preprogrammed effect, such as a particular projection, audio clip, or light pattern.

In an exemplary scenario, touch surfaces simulate an interactive space battle game on a wall of a play area. The touch surfaces attach to the surface of the wall and connect to one or more touch controllers. The touch surfaces can arrange in a repeating sequence to form a grid pattern that substantially covers the surface of the wall. A projection source projects content onto the surface of the wall and the projected content can indicate one or more touch surfaces with which a subject can interact to cause various effects and/or progress through the game. The projected content can include a window and space scene as observed from an interior of a spacecraft. To simulate the space battle, an effect controller causes the projection source to project updated content showing one or more enemy spaceships on approach to intercept the spacecraft. The updated projected content also includes content instructing subjects in the play area (e.g., children) to destroy the incoming enemy spaceships by touching the spaceships (e.g., thereby touching one of the touch surfaces on the wall).

In the same scenario, a computing environment monitors the positions of the projected spaceships with respect to pre-identified positions of the touch surfaces. When a subject touches one of the touch surfaces, the touch controller connected thereto detects the touch input and transmits the input to the computing environment. The computing environment compares the position of the touch surface to the current position of the projected spaceships and determines that at least one spaceship was projected onto the touch surface when the touch input was provided. Based on determining the touch input corresponds to the location of the spaceship, an effect controller of the computing environment determines effect criteria to be satisfied and transmits effect commands to the projection source, an audio source, and a light source. The effect commands cause the projection source to update the projected content to include an animation of the spaceship being destroyed, cause the audio source to play a laser and explosion sound effect through speakers in the play area, and cause the light source to momentarily increase brightness levels of one or more lighting elements to correspond with the animation and sound effects. Thus, by continuously monitoring for and responding to touch inputs, the computing environment utilizes the touch surfaces to provide an immersive and highly-responsive play area.

As used herein, "effect" generally refers to any output of a trigger-able electronic or mechanical device or apparatus. Non-limiting examples of effects include light effects, audio effects, projection effects, and kinetic effects. Light effects can include, for example, light activation and adjustment of light properties, such as color, intensity, and frequency. Audio effects can include, for example, a particular audio clip, sound, melody, and can include audio properties, such as volume, pitch, tempo, and beat. Projection effects can include, for example, content projected onto a screen or other suitable surface. Kinetics effects can include, for example, activation of a moving element or apparatus, such as activation of a moving display, initiation of a vibration effect, or re-configuration of touch surfaces.

According to a first aspect, a touch-capacitive surface system, comprising: A) a plurality of touch surfaces positioned along a target body, wherein each of the plurality of touch surfaces comprises a capacitive surface; B) a touch controller electrically coupled to each of the plurality of touch surfaces, wherein the touch controller is configured to detect a touch from a particular touch surface of the plurality of touch surfaces; C) a projection source; and D) at least one computing device in communication with the touch controller and the projection source, the at least one computing device being configured to generate, via the projection source, projected content at least partially onto the target body in response to the touch controller detecting the touch from the particular touch surface.

According to a further aspect, the touch-capacitive surface system of the first aspect or any other aspect, wherein the target body comprises a stationary structure in a play environment.

According to a further aspect, the touch-capacitive surface system of the first aspect or any other aspect, wherein the at least one computing device is further configured to detect a person climbed on the stationary structure in the play environment based on detecting the touch.

According to a further aspect, the touch-capacitive surface system of the first aspect or any other aspect, wherein the target body comprises a wall, and the plurality of touch surfaces are positioned in a grid pattern on the wall.

According to a further aspect, the touch-capacitive surface system of the first aspect or any other aspect, wherein the particular touch surface comprises: A) a drywall anchor electrically coupled to the touch controller; B) a conductive paint coupled to the drywall anchor; and C) a non-conductive material covering the conductive paint.

According to a further aspect, the touch-capacitive surface system of the first aspect or any other aspect, wherein the plurality of touch surfaces comprises a grid of sheets positioned adjacent each other on the wall, wherein each sheet of the grid of sheets comprises a conductive layer configured to form at least a subset of the plurality of touch surfaces.

According to a second aspect, a touch-capacitive surface system, comprising: A) a plurality of touch surfaces positioned along a target body, wherein each of the plurality of touch surfaces comprises a capacitive surface; and B) a touch controller electrically coupled to each of the plurality of touch surfaces, wherein the touch controller is configured to: 1) provide a respective electrical signal to each of the plurality of touch surfaces; 2) detect a voltage change in the respective electrical signal responsive for a particular touch surface of the plurality of touch surfaces in response to a change in dielectric properties of the capacitive surface for the particular touch surface; and 3) transmit a touch event comprising metadata describing the particular touch surface.

According to a further aspect, the touch-capacitive surface system of the second aspect or any other aspect, wherein each of the plurality of touch surfaces comprise at least one first conductive material separated from at least one second conductive material by an insulator to form the capacitive surface.

According to a further aspect, the touch-capacitive surface system of the second aspect or any other aspect wherein the at least one first conductive material is coupled to a positive conductor carrying the respective electrical signal and the at least one second conductive material is coupled to a negative conductor carrying to the respective electrical signal.

According to a further aspect, the touch-capacitive surface system of the second aspect or any other aspect, wherein at least one of the first conductive material and the second conductive material comprises a conductive paint.

According to a further aspect, the touch-capacitive surface system of the second aspect or any other aspect, further comprising: A) a projection source; and B) at least one computing device in communication with the touch controller and the projection source, the at least one computing device being configured to: 1) generate, via the projection source, projected content at least partially onto the target body; 2) receive the touch event over a network from the touch controller; and 3) update the projected content based at least in part on the metadata describing the particular touch surface.

According to a further aspect, the touch-capacitive surface system of the second aspect or any other aspect, wherein the at least one computing device is further configured to: A) receive a second touch event over the network from the touch controller, wherein the second touch event comprises additional metadata describing one of the plurality of touch surfaces; B) determine that the second touch event occurred within a predetermined time period of receiving the touch event based on the metadata describing the particular touch surface and the additional metadata describing the one of the plurality of touch surfaces; and C) update the projected content based on the determination that the second touch event occurred with the predetermined time period.

According to a further aspect, the touch-capacitive surface system of the second aspect or any other aspect, further comprising an effect source, wherein the at least one computing device is further configured to generate, via the effect source, a preprogrammed effect.

According to a third aspect, a method, comprising: A) providing, via a touch controller, an respective electrical signal to each of a plurality of touch surfaces on a target body; B) detecting, via at least one computing device in communication with the touch controller, a touch event on at least one touch surface of the plurality of touch surfaces based on a change in the respective electrical signal; and C) generating, via a projection source, a change to a play environment based at least in part on the touch event.

According to a further aspect, the method of the third aspect or any other aspect, further comprising: A) generating an interactive virtual game piece on one of the plurality of touch surfaces; and B) determining that the touch event on the at least one touch surface corresponds to an interactive virtual game piece, wherein the change to the play environment is further based on the touch event corresponding to the interactive virtual game piece.

According to a further aspect, the method of the third aspect or any other aspect, wherein the change to the play environment is based on a current state of an interactive event.

According to a further aspect, the method of the third aspect or any other aspect, wherein changing the play environment comprises rendering an indication for a next step in the interactive event.

According to a further aspect, the method of the third aspect or any other aspect, further comprising generating the plurality of touch surfaces by: A) inserting a plurality of anchors into the target body; B) electrically coupling the plurality of anchors to the touch controller; C) applying a conductive paint to the target body to form a plurality of conductive portions; and D) covering the conductive paint with a non-conductive material.

According to a further aspect, the method of the third aspect or any other aspect, further comprising: A) printing, via a cutting machine, a plurality of sheets of conductive material; and B) affixing the plurality of sheets of conductive material to the target body to form the plurality of touch surfaces.

According to a further aspect, the method of the third aspect or any other aspect, further comprising: A) affixing a plurality of leads to each of the plurality of sheets of conductive material; and B) affixing the plurality of leads to a multiplexer coupled to the touch controller.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE FIGURES

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein:

FIG. 2 shows an exemplary computing environment, according to one embodiment of the present disclosure;

FIG. 4 shows a perspective view of an exemplary fixture, according to one embodiment of the present disclosure;

FIG. 5 shows a top view of an exemplary fixture, according to one embodiment of the present disclosure;

FIG. 6 shows a perspective view of an exemplary fixture, according to one embodiment of the present disclosure;

FIG. 7 shows an exemplary touch controller, according to one embodiment of the present disclosure;

FIGS. 9A-C show exemplary target bodies, according to one embodiment of the present disclosure;

DETAILED DESCRIPTION

Figure 1:
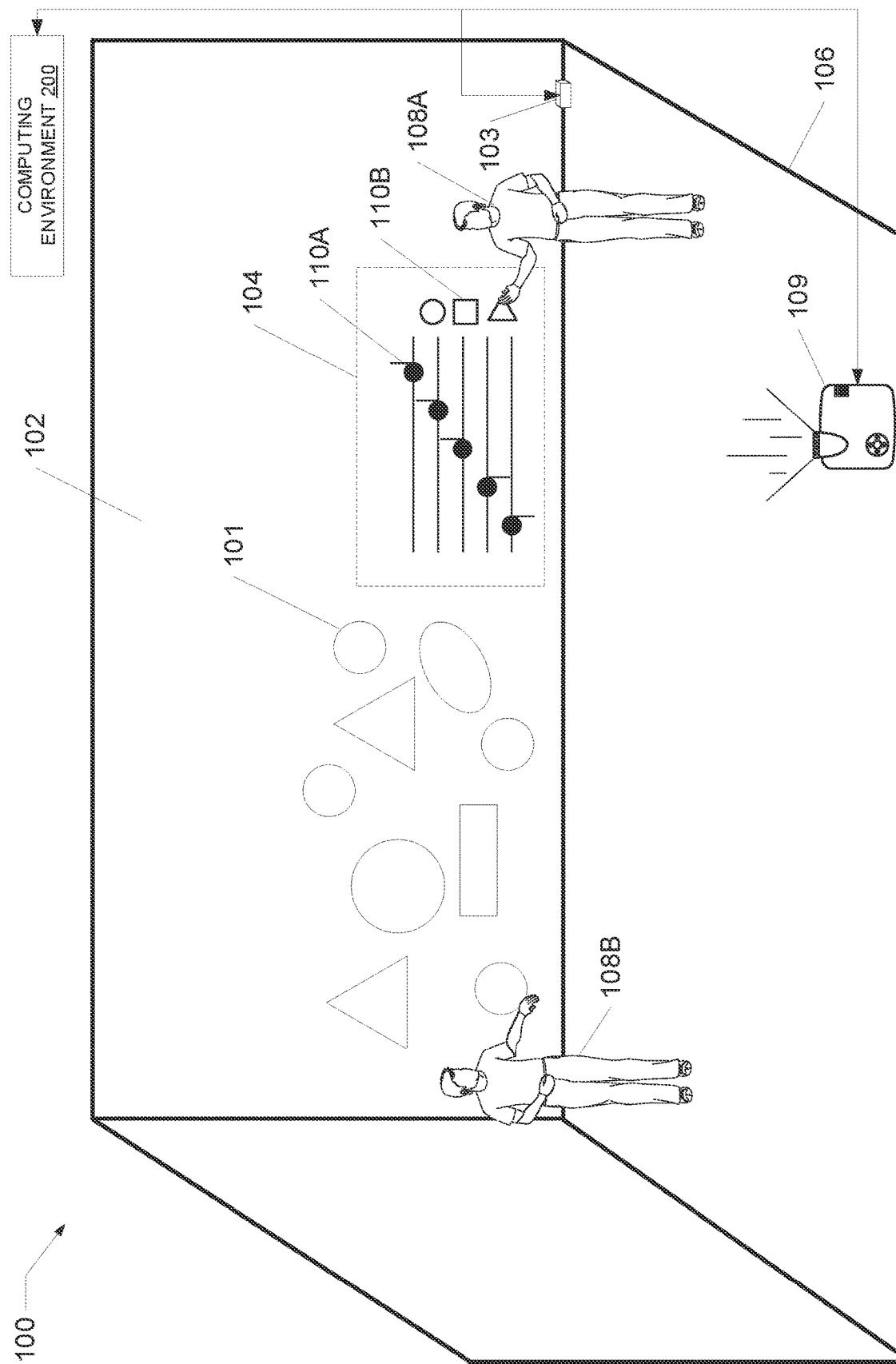
FIG. 1 shows an exemplary touch system, according to one embodiment of the present disclosure.

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Whether a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

Overview

Aspects of the present disclosure generally relate to capacitive touch systems and processes for making and using the same.

In various embodiments, the disclosed systems and methods allow for the conversion of existing stationary structures and movable objects to capacitive touch surfaces capable of sensing and responding to touch inputs. The present systems and methods can provide interactive play experiences based on detecting touch inputs and, in response, causing an effect source to generate an effect.

Exemplary Embodiments

Referring now to the figures, for the purposes of example and explanation of the fundamental processes and components of the disclosed systems and processes, reference is made to FIG. 1, which illustrates an exemplary touch system 100 according to one embodiment of the present disclosure. As will be understood and appreciated, the exemplary touch system 100 shown in FIG. 1 represents merely one approach or embodiment of the present disclosure, and other aspects are used according to various embodiments of the present disclosure.

The touch system 100 can include a physical environment 106, such as, for example, a play environment for children. The touch system 100 can generate and control various effects by receiving touch input from subjects 108A, 108B. The touch system 100 can include one or more touch surfaces 101 for receiving touch input. The touch surface 101 can be positioned on a target body 102. The target body 102 generally refers to any physical object or structure. Non-limiting examples of the target body 102 include walls, doors, windows, and movable objects, such as blocks. In one example, the physical environment 106 includes large, climbable blocks and each block includes a touch surface 101 such that the touch system 100 can receive touch input in response to a subject climbing or moving one or more blocks. In some embodiments, the target body includes drywall, concrete, wood, glass, or other substantially non-conductive materials. Multiple touch surfaces 101 can form a touch region 104 on the target body 102 such that any contact by a subject with the touch region 104 generates a touch input. In one example, a touch region 104 positioned on a wall allows the wall to function similar to a touch screen of a computing device, such as a tablet.

The touch system 100 can include a projection source 109 that projects content onto the target body 102. The projection source 109 can project content onto a region of the target body 102 that corresponds to a position of the touch surface 101. By coordinating and controlling projected content based on touch interaction, the present systems and processes can convert surfaces and objects into immersive and highly interactive educational tools. In one example, the projection source 109 projects indicia 110A, 110B for indicating a touch region 104 including multiple touch surfaces. In this example, the indicia 110A, 110B indicate musical notes and, by receiving touch inputs at the indicia 110A, 110B, the touch surfaces allow the target body 102 to function as a musical education tool. Continuing the example, the touch region 104 receives a sequence of touch inputs to the indicia 110A, 110B and the computing environment 200 processes the touch inputs to cause emission of a custom audio track into the physical environment 106 (e.g., the custom audio track being generated based on the touch surfaces that received the touch inputs).

The touch surface 101 can include one or more shapes including, but not limited to, polygon-based shapes, oval-based shapes, irregular shapes, striped or patterned shapes, and any other 2-dimensional shapes. The touch surface 101 can receive touch input (e.g., a touch from a human hand, finger, etc.). The touch surface 101 can connect to a touch controller 103 that detects touch input received at the touch surface 101. The touch controller 103 and touch surface 101 can communicate via wired or wireless electrical signals. The touch controller 103 can supply power (e.g., voltage) to a touch surface 101. In some embodiments, the touch controller 103 supplies wired power to the touch surface 101 and the touch surface 101 communicates wirelessly to exchange data, such as touch inputs.

The touch surface 101 can connect to the touch controller 103 by wired means, such as transmission wires, or by wireless means, such as WiFi, Bluetooth, RFID, Zigbee, near field communication (NFC), ultra-wideband, and other wireless technologies. The touch controller 103 can detect touch input from multiple touch surfaces 101 (e.g., 2-100 touch surfaces 101). For example, the touch controller 103 detects touch input from fifty touch surfaces 101. The touch controller can connect to the touch surface 101 via a wired connection to a general purpose input-output (GPIO) line. The touch controller 103 can include or connect to one or more multiplexer circuits that detect and process touch inputs from multiple touch surfaces 101. In one example, the touch controller 103 includes four multiplexer circuits and each of the four multiplexer circuits connects to sixteen touch surfaces 101. In this example, the multiplexer circuits allow the touch controller 103 to receive touch inputs from sixty-four touch surfaces 101. By multiplexing signals from touch surfaces 101, the touch controller 103 can detect the strength of each touch input. The touch controller 103 can control effect sources, such as the projector 109, based on touch input strength, a quantity of touch inputs, or other criteria.

When a touch surface 101 receives touch input from a touch source (e.g., a human finger, hand, arm, foot, head, etc.), conductive coating of the touch surface 101 causes electrical conduction of the supply voltage from the touch surface 101 to the touch source. The touch controller 103 can detect and measure the conduction of the supply voltage as a drop in voltage readings. Based on the detected voltage drop (and/or additional factors described herein), the touch controller 103 can communicate with a networked computing environment 200 (e.g., further shown in FIG. 2) to coordinate generation or suspension of one or more effects by one or more effect sources 207.

The touch controller 103 generally refers to any computational device, such as a microcontroller, that is operative to detect electrical fluctuations at the touch surface 101 and communicate over a network 202 with a computing environment 200 (see FIG. 2). The touch controller 103 can measure, for example, current, voltage, resistance, capacitance, or impedance fluctuations. As one example, the touch controller 103 measures measure a magnitude of voltage running through a touch surface 101 and registers a touch input based on detecting a fluctuation in the measured voltage that exceeds a predetermined threshold. Thus, as used herein, a "touch" or "touch input" generally refers to an instance where a touch controller 103 detects a threshold-satisfying fluctuation in electrical signal from a connected touch surface 101.

One or more projection sources 109 can project content onto the target body 102 to indicate the presence of the one or more touch surfaces 101 and project other content (such as animations, graphics, etc.). The content can include, for example, outlines and shapes corresponding to dimensions and contours of a touch surface 101. Because a touch surface 101 may be visually indistinguishable from a front surface of the target body 102, projection sources 109 are used to provide dynamic visual indicators of touch surface 101 location and interaction. In one example, a projection source 109 projects a circle shape onto a circular-shaped touch surface 101. Upon the touch surface 101 receiving touch input, the projection source 109 can receive a projection command to update the projected content to indicate the receipt of the touch input. The update to the projected content can include, for example, changing one or more projected content colors or content dimensions.

FIG. 2 shows an exemplary computing environment 200. According to one embodiment, the computing environment 200 includes an operational computing environment 201 in communication, via a network 202, with one or more touch surfaces 101, one or more touch controllers 103, and one or more effect sources 207. The operational computing environment 201 can include an operational application 203 and an operational data store 205. The operational application 203 can include a data manager 209 and one or more effect controllers 211.

The operational computing environment 201 is operative to receive transmissions from the one or more touch controllers 103 (e.g., in response to touch input being detected and received at the one or more touch surfaces 101). In response to receiving a transmission from the one or more touch controllers 103, the operational computing environment 201 can cause the one or more effect sources 207 to generate a preprogrammed effect. In some embodiments, the effect can be determined in real-time based on a variety of parameters and configurations. As will be understood by one of ordinary skill in the art, the networked components of the computing environment 200 send and receive transmissions and commands at suitably rapid speeds such that, to a human observer, touch of a touch surface 101 and generation of a corresponding effect by an effect source 207 appears to occur substantially simultaneously. As will be further understood by one of ordinary skill in the art, the computing environment 200 can control and execute effects at speeds and volumes unreachable through previous methods, such as manual or partially-manual control by one or more human operators. Thus, in various embodiments, the computing environment 200 provides a substantially automated and highly configurable system for monitoring multiple capacitive touch surfaces 101 and rapidly coordinating multiple, corresponding effect generations in response to detecting touch inputs thereto.

The network 202 includes, for example, the Internet, intranets, extranets, wide area networks (WANs), local area networks (LANs), wired networks, wireless networks, or other suitable networks, etc., or any combination of two or more such networks. For example, such networks may include satellite networks, cable networks, Ethernet networks, and other types of networks. In at least one embodiment, the computing environment 200 includes a system or process for publish-subscribe-based show control that coordinates activities between elements of the touch system 100.

The operational application 203 can receive and transmit information via the network 202 with touch surfaces 101, touch controllers 103, and effect sources 207. In a publish-subscribe-based show control scheme, the network 202 can include a broker for receiving commands published thereto by effect controllers 211 and for transmitting the commands to one or more effect sources 207 subscribed to one or more topics associated with the commands.

The operational environment 201 may include, for example, a server computer or any other system providing computing capability. Alternatively, the operational environment 201 may employ computing devices that may be arranged, for example, in one or more server banks or computer banks or other arrangements. Such computing devices may be located in a single installation or may be distributed among many different geographical locations. For example, the operational environment 201 may include computing devices that together may include a hosted computing resource, a grid computing resource and/or any other distributed computing arrangement. In some cases, the operational environment 201 may correspond to an elastic computing resource where the allotted capacity of processing, network, storage, or other computing-related resources may vary over time.

Various applications and/or other functionality may be executed in the operational environment 201 according to various embodiments. The operational environment 201 can include an operational application 203 that can receive and process data from the touch controllers 103 and/or the touch surfaces 101, from the operational data store 205, and from the effect sources 207. The operational application 203 can include one or more processors and/or servers, and can connect to the operational data store 205. The operational data store 205 may organize and store data, sourced from the effect sources 207, touch controllers 103, and/or touch surfaces 101 that are processed and provided by the operational application 203. Accordingly, the operational data store 205 may include one or more databases or other storage mediums for maintaining a variety of data types. The operational data store 205 may be representative of one or more data stores, as can be appreciated. Data stored in the operational data store 205 can be associated with the operation of various applications and/or functional entities described herein. Data stored in the operational data store 205 may be accessible to the operational environment 201 and to an aggregated computing environment, such as, for example, a cloud-based environment for storing and analyzing data sets.

The operational data store 205 can store various data including, but not limited to touch surface data 213, effect data 215, counter data 217, and threshold data 219. The touch surface data 213 includes information describing the one or more touch surfaces 101 and/or touch controllers 103. The information can include, for example, touch surface identifiers, touch controller identifiers, touch surface activation history (e.g., timestamps of when a particular touch surface 101 received touch input), effect source identifiers for effect sources 207 associated with each touch surface 101, and touch surface titles, such as text strings, for labeling each touch surface 101.

The effect data 215 can include, for example, activation criteria describing one or more conditions that must be met for causing an effect source 207 to generate a preprogrammed effect. The effect data 215 can include effect source identifiers, effect source titles, such as text strings, effect activation history, lists of preprogrammed effects (including corresponding identifiers and/or descriptions thereof), effect settings, and effect source status (e.g., "generating an effect," "awaiting effect command," "effect source down," etc.). According to one embodiment, the effect data 215 includes data describing predetermined effects that are executed or performed based on particular drops in voltage measured by the touch controllers 103. The particular drops in voltage value can be stored as threshold data 219. In one example, an effect source includes a first-level effect associated with a drop in voltage within a first range and a second level effect associated with a drop in voltage within a second range greater than the first range. It can be appreciated that an exemplary drop in voltage is used herein but in some embodiments the trigger or threshold for a touch can be an increase in voltage, a change to a signal, or noise being introduced to a signal. Because different touch inputs and touch input sources can cause disparate voltage drops at a touch surface 101, voltage drop criteria can be used to coordinate different effects based on who or what provides the touch input, or how the touch input is provided.

For example, human flesh demonstrates a lower dielectric constant than silicon (e.g., silicon is more conductive than human flesh). When in contact with a touch surface 101, a bare human hand may cause a voltage drop in a lower range than a voltage drop caused by a silicon-gloved hand. By associating known voltage drop ranges with particular preprogrammed effects, the touch system 100 can generate various effects by touching the same touch surface 101 with different materials. A subject, such as a staff member supervising a play area, can use an object with a different dielectric constant than human flesh to cause, modify, or suspend various preprogrammed effects associated with touch input to touch surfaces 101.

The counter data 217 can include information describing one or more counters used to record and track various activities occurring in the touch system 100. Examples of data recorded by counters include, but are not limited to, touch count, touch frequency, touch period (e.g., time between touches or duration of a touch), and non-touch period. The information associated with the counter can include current and historical counter values, identifiers for the particular touch surface 101 and/or subject that correspond to a counter, and other information.

The threshold data 219 can include information describing one or more thresholds used to parameterize and control activities of the computing environment 200. Examples of thresholds include, but are not limited to, touch count threshold, touch frequency thresholds, touch period thresholds, voltage change thresholds, capacitance change thresholds, current change thresholds, and resistance change thresholds. The information associated with the one or more thresholds can include current and historical threshold values, identifiers for the particular touch surface 101 and/or subject that correspond to a threshold, and other information.

The data manager 209 is operative to update (e.g., increment, decrement, etc.) the counter data 217 and the threshold data 219 based on transmissions received from touch controllers 103, touch surfaces 101, effect sources 207, and/or other inputs to the operational computing environment 201. The data stored in the operational data store 205 can be organized based on identifiers of touch surfaces 101, effect sources 207, and/or subjects associated with the data. For example, threshold data 219 corresponding to a voltage drop threshold for a particular touch surface 101 can include an identifier associated with the particular touch surface 101. Communications between the operational application 203, the effect controllers 211, and the touch controllers 103 can include one or more identifiers that are parsed therefrom by the data manager 209 and used to organize the data.

The operational application 203 can include a one or more effect controllers 211 for coordinating activities of the effect sources 207 in response to touch inputs received at one or more touch surfaces 101. Each of the effect controllers 211 can analyze touch surface data 213, effect data 215, counter data 217, and/or threshold data 219 to determine one or more effect commands to send (or not send) to an associated effect source 207.

The effect sources 207 can include, but are not limited to, light sources 221, audio sources 223, and kinetic sources 225. The light source 221 can include light fixtures, light-emitting diode (LED) strips, dimmer switches, and other light-emitting or light emission-modulating elements. The audio sources 223 can include speakers, MIDI control elements, electronic instruments, and other audio-related elements. The kinetic sources 225 can include animatronics, hydraulic or pneumatic elements, confetti cannons, and other elements configured for electromechanical motions or other motions. A projection source 109 can also function as an effect source 207, for example, upon receiving a projection command from an effect controller 211.

In some embodiments, a target body 102 or touch surface 101 includes a radio frequency identification (RFID) reader. An RFID reader can detect and interrogate (e.g., read) RFID tags brought within a predetermined proximity of the RFID reader. When an RFID reader interrogates a tag, the RFID reader can obtain one or more identifiers uniquely identifying the RFID tag (e.g., and the subject or object in which the RFID tag is disposed). A touch controller 103 can receive identifiers from the RFID reader, for example, via the connection between the touch controller 103 and the corresponding touch surface 101. In another example, the touch controller 103 receives identifiers via a wired or wireless communication transmitted from the RFID reader. In another example, the operational application 203 receives identifiers via wired or wireless transmissions from the RFID reader, the transmissions including the obtained identifier, an identifier associated with the RFID reader, and/or an identifier associated with a touch surface 101 nearest to the RFID reader. In one example, a subject wears a bracelet including an RFID tag. As the subject touches a touch surface 101, an RFID reader located therein (or nearby) interrogates the RFID tag and obtains an identifier uniquely identifying the subject. By associating identifiers with received touch inputs, the computing environment 200 can detect which touch surface 101 received touch input and/or identify who or what provided the touch input.

In some embodiments, the computing environment 200 includes one or more computer vision sources (e.g., cameras, image sensors, etc.) to track the interaction of subjects with the touch system 100. For example, when a touch surface 101 receives a touch input, a computer vision source captures images of the touch surface 101 and surrounding area. In the same example, the computing environment 200 processes the images to identify the subject. The computing environment 200 can leverage tracked interactions with the touch surfaces as inputs to various processes including, but not limited to, recommendation generation processes, content generation processes, and content triggering processes. Exemplary systems and methods for recommendation generation, content generation, and content triggering processes are described in U.S. patent application Ser. No. 16/998,583, filed Aug. 8, 2020, entitled "TRAINING MACHINE LEARNING MODELS FOR AUTOMATED COMPOSITION GENERATION," U.S. patent application Ser. No. 16/998,595, filed Aug. 20, 2020, entitled "TRAINING MACHINE LEARNING MODELS FOR INTEREST PREDICTION," and U.S. patent application Ser. No. 17/000,972, filed Aug. 24, 2020, entitled "OBJECT DETECTION-BASED CONTROL OF PROJECTED CONTENT," each of which is incorporated herein by reference as if set for in its entirety.

Figure 3A:
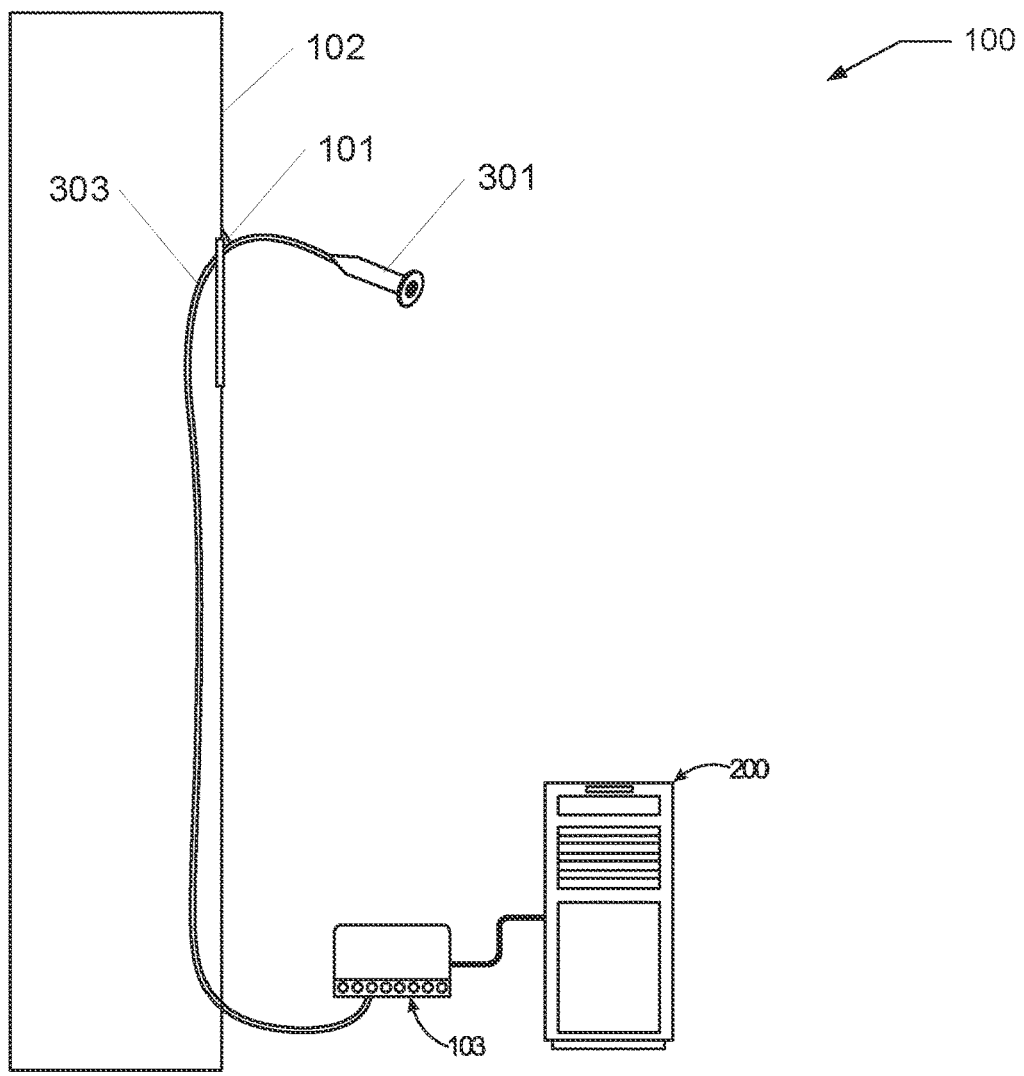
FIG. 3A shows an exemplary touch system, according to one embodiment of the present disclosure.

FIG. 3A shows an exemplary touch system 100, according to one embodiment. A touch surface 101 can include a fixture 301 (e.g., a drywall anchor). The fixture 301 can include a conductive material, such as copper or zinc. The fixture 301 can connect to a wire 303 for connecting the touch surface 101 to the touch controller 103. The fixture 301 can attach a conductive material to the target body 102. In one example, the fixture 301 attaches a copper or zinc sheet to the target body 102.

In alternate embodiments, the touch surface 101 includes an electrical sensor, such as a sensor similar to an electrocardiogram (EKG) patch. The electrical sensor can attach to a back surface of the target body 102. The electrical sensor can sense electromagnetic signals generated by subjects in close proximity to the touch surface 101. The electrical sensor can communicate with the touch controller 103 via the network 202.

Figure 3B:
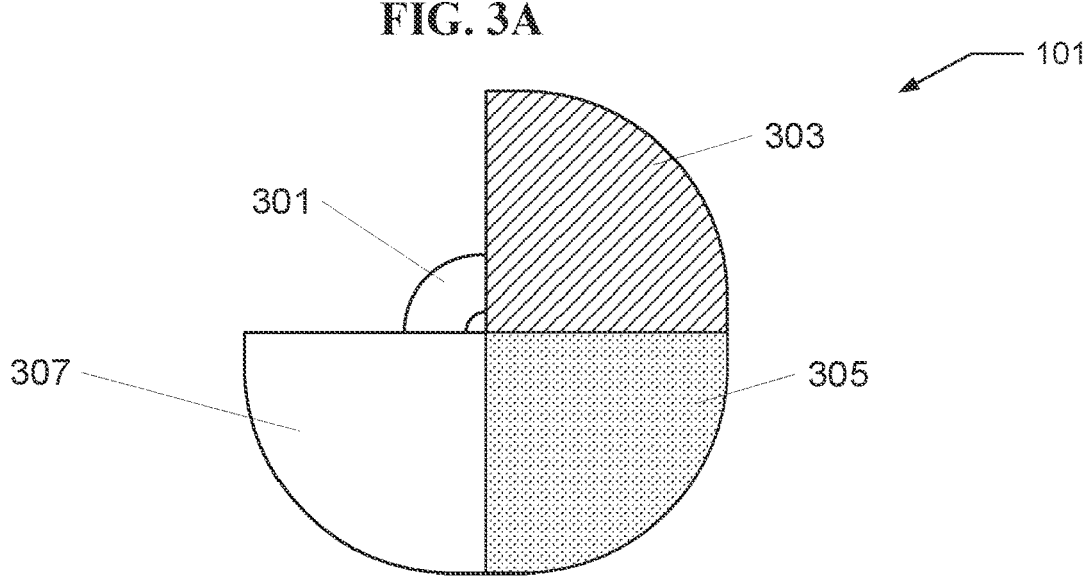
FIG. 3B shows an exemplary touch surface, according to one embodiment of the present disclosure.

FIG. 3B shows an exemplary touch surface 101, according to one embodiment. For the purposes of describing exemplary touch surface concepts, FIG. 3B omits various portions of the touch surface 101 to better illustrate elements thereof. The touch surface 101 can include a fixture 301, a conductive layer 303, and one or more non-conductive layers 305A, 305B. The conductive layer 303 can substantially cover the fixture 301. In one example, the conductive layer 303 includes a conductive coating, such as a conductive paint (e.g., a paint composition including conductive material). The non-conductive-layers 305A, 305B can substantially cover the conductive layer 303. In one example, the non-conductive layer 305A includes drywall mud and the non-conductive layer 305B includes drywall paint. In another example, the conductive layer 303 includes a conductive sheet (e.g., a copper or zinc sheet) and the non-conductive layer 305A includes decorative paint.

The fixture 301 and conductive layer 303 can receive an electrical current. In some embodiments, the fixture 301 and conductive layer 303 function as an electrode circuit from which a touch controller reads a voltage or other property. When a conductive body (e.g., a finger) moves within range of the touch surface 101 (e.g., about 2-3 inches, about 3-5 inches, about 5-7 inches), the conductive layer 303, non-conductive layers 305A, 305B, and the conductive body (e.g., a finger) can generate a capacitive interaction that causes a fluctuation in the electrode circuit. The non-conductive layers 305A, 305B can function as an insulator between the conductive body and the conductive layer 303, thereby forming a capacitor. The touch controller can detect the fluctuation (e.g., by detecting a change in capacitance, current, voltage, resistance, etc.), determine that touch input occurred, and a computing environment can perform actions in response to the touch input.

FIG. 4 shows a perspective view of an exemplary fixture 301. The fixture 301 can include a first end 401 and a second end 403 opposite the first end 401. The first end 906 can connect to a conductive layer, such as, for example, a layer of conductive paint or a conductive sheet. The second end 403 can connect to a wire or other element for connecting a touch surface to a touch controller.

FIG. 5 shows a top view of an exemplary fixture 301. In some embodiments, the fixture 301 includes a non-conductive coating. Fabricating a touch surface can include removing a non-conductive coating from a top surface 501 of the fixture 301. Removal of the non-conductive coating can improve touch input detection due to increased conductivity through the touch surface.

FIG. 6 shows a perspective view of an exemplary fixture 301. The fixture 301 can include a void 601 through which a wire 303 secures to the fixture 301. In some embodiments, fabricating the touch surface 101 includes forming the void 601 in the fixture 301.

FIG. 7 shows an exemplary touch controller 103. The touch controller 103 can include inputs 701A, 701B for connecting to touch surfaces and other elements of the touch system. In one example, a first end of a wire connects to a conductive portion of a touch surface 101 (e.g., a fixture, conductive layer, etc.) and a second end of the wire connects to the input 701A. In some embodiments, the input 701B connects to a multiplexer for processing signals from several touch surfaces 101. The touch controller 103 can include a communication port 703 for connecting to and communicating with a computing environment 200.

Figure 8:
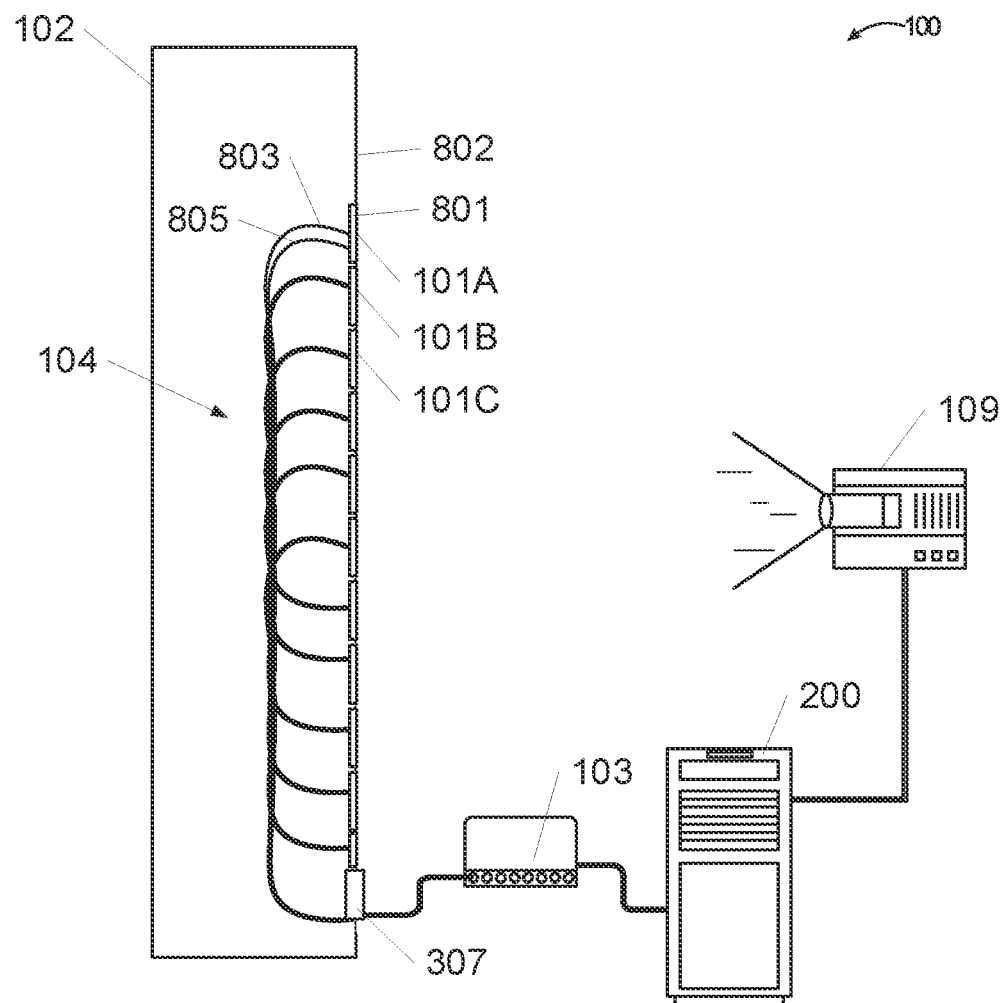
FIG. 8 shows an exemplary touch system, according to one embodiment of the present disclosure.

FIG. 8 shows an exemplary touch system 100, according to one embodiment. The touch system 100 can include multiple touch surfaces 103A-C arranged into columns and rows (e.g., forming a matrix pattern). Each touch surface 103A-C can include a conductive layer 801. The conductive sheet 801 can include conductive material, such as copper or zinc. The conductive sheet 801 can flex, for example, to conform to contours of a target body 102. The conductive sheet 801 can include sub-sections with greater or lesser conductive material density or coverage. In one example, the conductive sheet 801 includes alternating stripes of conductive and non-conductive materials. The conductive sheet 801 can attach to the target body 102 such that the conductive sheet 801 is coplanar with a front surface 802 of the target body 102. A non-conductive layer can cover the conductive sheet 801. Non-limiting examples of non-conductive layers include paint, drywall mud, and other coatings. When a conductive body (e.g., a finger), is brought within proximity of the touch surface, the conductive sheet 801, non-conductive layer, and conductive body can generate a capacitive interaction. The non-conductive layer can function as an insulator between the conductive layer 801 and the conductive body, thereby forming a capacitor. The touch controller 103 can detect the capacitive interaction by detecting a fluctuation in signal through the wires 803, 805.

Each touch surface 103A-C can connect to a touch controller 103 via a pair of wires 803, 805. The wires 803, 805 of each touch surface 103A-C can connect to a multiplexer 807. In various embodiments, the multiplexer 807 connects to the touch controller 103 such that the touch controller 103 can simultaneously receive touch inputs and compute touch input strength from each of the touch surfaces 103A-C. In one example, the touch system 100 includes 80×80 matrix of touch surfaces and ten multiplexers by which a single touch controller 103 detects touch input.

FIG. 9A shows an exemplary target body 102, according to one embodiment. Touch surfaces 101A can arrange into columns 906 and rows 908 and, thereby, form a touch-receptive region 104A in a substantially matrix- or grid-based shape. By mapping projected content on the touch-receptive region 104A, the touch system 100 can support customized, precise, and accurate touch-based interfaces.

A predetermined distance 902 can separate each of the touch surfaces 101A to improve touch input detection accuracy and precision by limiting generation of simultaneous capacitive interactions at neighboring touch surfaces. In some embodiments, the touch surfaces 101A contact each other or overlap. The touch surfaces 101A can collectively or individually connect to a multiplexer or touch controller (not shown). In one example, neighboring touch surfaces 101A contact each other, thereby forming conductive connections across the columns 906 and rows 908. In this example, the touch surfaces 101A connect to a microcontroller at a first column (e.g., at an edge of the touch-receptive region 104A) and at an end column (e.g., at an opposite edge if the touch-receptive region 104A). In the same example, the touch surfaces 101A receive power from a touch controller via the connection at the first column and transmit touch input signals to the touch controller via the connection at the end column.

In one embodiment, the adjacent conductive cells in the columns 906 and rows 908 can form two plates of a capacitor where human flesh positioned near adjacent cells can alter an analog signal transmitted across the capacitor by changing a dielectric constant of the capacitor. The two adjacent sells can be insulated from one another to form a capacitive surface. The analog signals from each column 906 and row 908 can be multiplexed to facilitate the microcontroller detecting a location where the signal is altered (e.g., where a touch event occurred).

Touch surfaces 101B can arrange into a touch-receptive region 104B. A conductive sheet 801 of each touch surface 101B can be cut or printed into a desired shape and subsequently arranged to form the touch-receptive region 104B. The touch surfaces 101B can individually connect to a multiplexer or touch controller. In some embodiments, the touch surfaces 101B connect to a shared wire or other element for connection to the touch controller. Neighboring touch surfaces 101B can contact each other such that touch input received at any point within the touch-receptive region 104B is detectable by the touch controller. Touch surfaces 101C can arrange into a touch-receptive region 104C. Conductive sheets 801 can overlap to increase a strength of capacitive interactions generated when a conductive body moves proximate to the touch-receptive region 104C.

Fabricating the touch surfaces 101A-C can include printing and/or cutting conductive sheets 801 from a roll, a ream, or other source of conductive material. Installing the touch surfaces 101A-C can include affixing the conductive sheets 801 to the target body 102 and connecting each conductive sheet 801 to a multiplexer circuit or touch controller. In one example, installing the touch surfaces 101A-C includes affixing a first end of a lead to each conductive sheet 801 and affixing a second end of each lead to a multiplexer.

FIG. 9B shows an exemplary target body 102, according to one embodiment. The target body 102 can include touch-receptive regions 104A, 104B, 104C formed from touch surfaces 101A, 101B, 101C (not shown, see FIG. 9A). The touch regions 104A-C can be invisible to viewers, for example, due to a lack of identifying indicia on the target body 102. The touch regions 104A-C can be invisible until a projection source projects content onto the target body 102, such as, for example, patterns or shapes that outline the touch regions 104A-C or define areas therewithin. In one example, a projection source projects outlines 901A-C to visibly define the touch regions 104A-C.

FIG. 9C shows an exemplary target body 102, according to one embodiment. The target body 102 can include touch surfaces arranged into columns 906 and rows 908. A touch surface 101 can include a first conductive region 907 and a second conductive region 909. The conductive regions 907, 909 can include conductive material, such as copper or zinc. In one example, the conductive regions 907, 909 include copper sheets printed and/or cut into a desired dimension and shape. As an example cutting-style printer/cutting machine (e.g., a cutting plotter) can be used to cut or remove material based on a printing template. An insulator region 910 can separate and insulate the conductive regions 907, 909. In some embodiments, the insulator region 910 corresponds to an area of removed material that was removed from the conductive material by the printer. The insulator region 910 can include an insulator material, such as air, waxed paper, drywall, mica, ceramic, or plastic. The insulator region 910 can define a dielectric constant that determines a magnitude of electric signal that passes through the capacitive circuit. The conductive region 907 and conductive region 909 can function as a first plate and a second plate of a capacitor, and the insulator region 910 can function as an insulator between the first plate and the second plate. When a conductive body moves near the touch surface 101, the conductive body can alter a dielectric constant of the insulator region 910, thereby causing a delta in the electric signal through the capacitive circuit.

The conductive region 907 can connect to a lead 911. For purposes of illustration, a single lead 911 is shown in FIG. 9C; however, it will be understood and appreciated that each conductive region 907 of each touch surface 101 can connect to a lead 911. Each column 906 can include a column lead 913 for connecting to the conductive regions 907 of the column 906. Each row 909 can include a row lead 915 for connecting to the conductive regions 909 of the row 909. The leads 911, 913, and 915 can connect to a multiplexer 907 (and/or demultiplexer) for supplying power to and reading electrical signals from each touch surface 101. Between the touch surface 101 and the multiplexer 307, the lead 911 and/or the lead 913 can function as a positive conductor and the lead 915 can function as a negative conductor.

The multiplexer 307 can multiplex electrical signals from each column 906 and row 908 to facilitate a microcontroller (e.g., a touch controller) detecting a location where the signal is altered (e.g., where a touch event occurred). For example, the microcontroller iteratively samples an electrical signal from each column 906, row 908, and conductive region 907. In this example, the microcontroller maps the electrical signal values to a cell-based coordinate grid (e.g., an array representing a grid-structure formed by the columns 906 and rows 908). In the same example, the microcontroller determines touch input location by analyzing electrical signal deltas of each cell and identifying one or more cells demonstrating a peak and/or threshold-satisfying delta, which may be indicative of touch input location.

Figure 10:
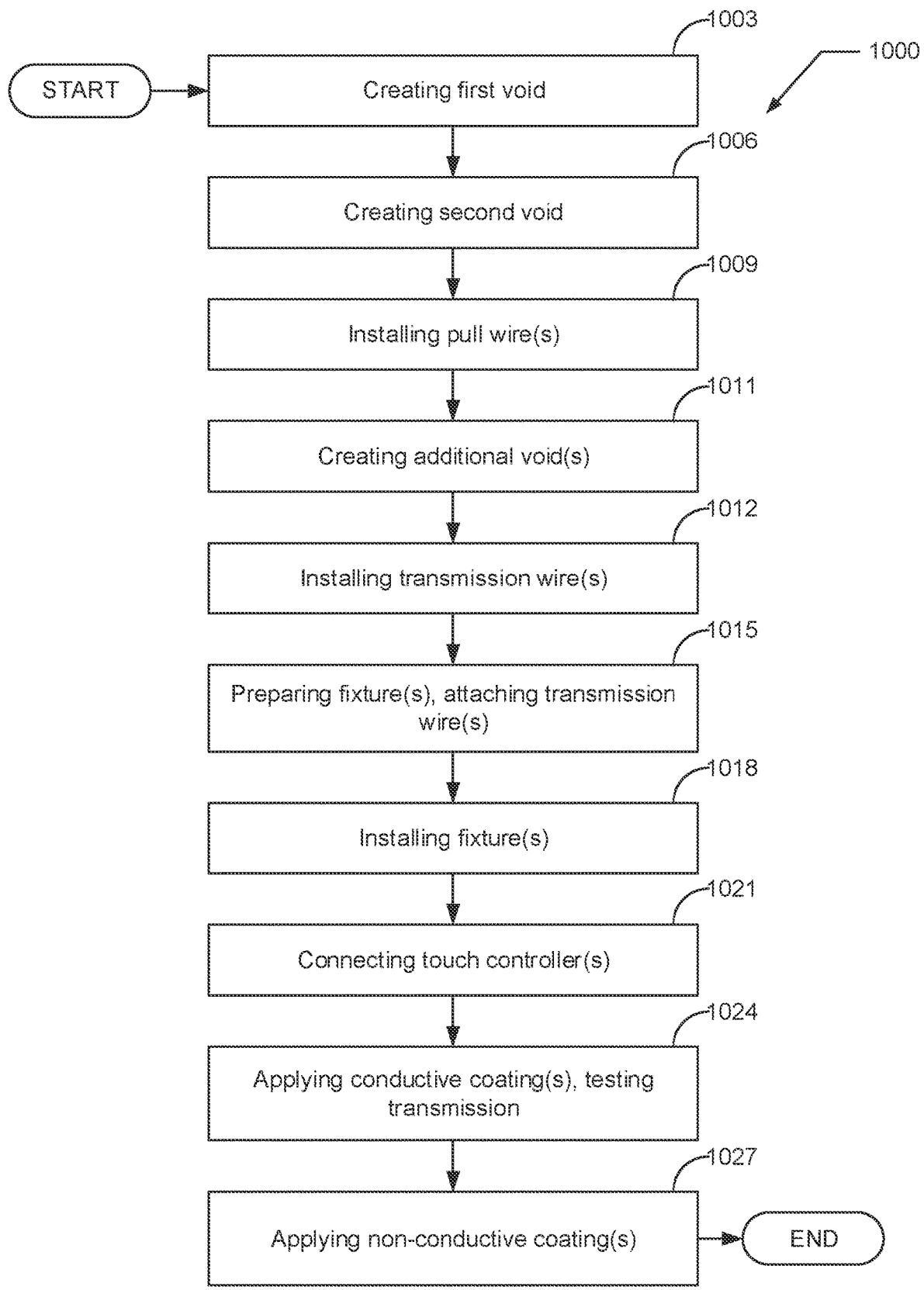
FIG. 10 shows an exemplary touch surface fabrication process, according to one embodiment of the present disclosure.

FIG. 10 shows an exemplary touch surface fabrication process 1000. As will be understood by one having ordinary skill in the art, the steps and processes shown in FIG. 10 (and those of all other flowcharts and sequence diagrams shown and described herein) may operate concurrently and continuously, are generally asynchronous and independent, and are not necessarily performed in the order shown.

At step 1003, the process 1000 includes creating a first void in a portion of a target body 102 that will serve as the touch surface 101. First void indicia, such as a pencil mark, can be placed onto the target body 102 at a predetermined height. The predetermined height can be the height at which a fixture is placed as further described herein. The first void indicia can be located between structural supports adjacent to the portion of the target body 102 and/or is located a substantial distance from any metal present in the target body 102. In one example, the first void indicia location avoids vertical studs, wiring, plating, and piping.

Forming the first void can include creating a hole through the portion of the target body 102 indicated by the first void indicia. The first void can fully penetrate through a front and back surface of the target body 102. The first void can be formed via drilling through the portion of the target body 102 at the first void indicia. Dimensions of the first void can permit passage of a fixture described herein. In one example, the first void includes a diameter of about 0.375 inches.

At step 1006, the process 1000 includes creating a second void in the target body 102. The second void can be created in a manner substantially similar to the creation of the first void. The process 1000 can include applying or marking second void indicia onto a second portion of the target body 102 that is vertically aligned with and vertically inferior to the first void (e.g., and first void indicia). In one example, step 1003 includes forming a first void on a wall at a height of 3.5 feet. In the same example, step 1006 includes forming a second void the wall at a height of 0.25 feet and in vertical alignment with the first void. According to one embodiment, the process 1000 omits the step 1006, for example, in instances where communication between the touch surface 101 and a touch controller 103 occurs wirelessly or in instances where the touch controller 103 is placed within or behind the target body 102 (e.g., on the same side as the back surface thereof). Formation of the second void can include removing a baseboard or other decorative feature of the target body 102. Dimensions of the second void can permit passage of a transmission element, such as one or more wires of one or more gauges. In one example, the second void includes a diameter of about 0.375 inches. In another example, the second void permits passage of a 22 American wire gauge (AWG) wire.

At step 1009, the process 1000 includes installing a pull wire between the first and second voids to assist in the installation of one or more transmission wires. A section of pull wire can be obtained (e.g., cut from a pull wire spool or another source). The section of pull wire can include a length of at least about 1 foot greater than the vertical distance between the first void and the second void. A ferromagnetic weight (such as, for example, a ⅜ inch OD bolt nut) can be tied to a first end of the pull wire. The first end of the pull wire feed through the first void and the attached weight can drop a few inches downward, behind the surface of the target body 102. A magnet applied to the target body 102 can interact with the attached weight. For example, a magnet attracts and permits manipulation of the weight when held against the front surface of the target body 102 in horizontal and vertical alignment with the weight. The magnet, and as a result the weight attracted thereto, can be drawn downward along the target body 102 to the second void. Means alternative to the above-described magnet can be used to thread the transmission wire(s) behind or through the target body 102. In one example, a stiff hook attached to a cable threads up through the second void and connects to the transmission wire. In some embodiments, a fish tape or fiberglass rod can guide the transmission wire through the wall.

At step 1011, the process 1000 includes forming one or more additional voids, similar to the second void, in vertical alignment with and between the first and second voids. The one or more additional voids can be performed in instances where additional capacitive touch surfaces 101 (e.g., or a single, distributed touch surface 101) are desired. Following the formation of the one or more additional voids, a hook can pull a small section of the pull wire through each of the one or more additional voids. At each of the one or more additional holes, an additional transmission wire can affix to the pull wire (e.g., via tying or adhesives, such as tape). The additional transmission wires can include a coloration distinct from a color of the pull wire to enable differentiation therefrom.

At step 1012, the process 1000 includes installing a transmission wire by affixing the transmission wire to the pull wire at the first void. Following affixation of the transmission wire, the weight and pull wire can be pulled from the second void, thereby causing the affixed transmission wire (e.g., and the one or more affixed additional transmission wires) to travel downwards. The transmission wire can be pulled behind the target body 102 and to the second void. The transmission wire and any additional transmission wires can be drawn through the second void in front of the target body 102 and disconnected from the pull wire.

At step 1015, the process 1000 includes preparing a metal fixture (e.g., a fixture 301 shown FIGS. 3A-6). The process 1000 can include attaching the transmission wire thereto. In at least one embodiment, the process 1000 further includes preparing one or more additional fixtures and attaching the one or more additional transmission wires thereto.

Preparing the fixture can include lightly sanding an external face of the metallic fixture and a tip of the metal fixture opposite the external face to remove an outer coating and increase the conductivities thereof. Preparing the fixture can include creating a void in the tip of the metal fixture (e.g., as shown in FIG. 6). In one example, a void measuring about 0.0625 inches is drilled into through the tip of the metal fixture. In at least one embodiment, the void permits passage of a portion of the transmission wire. In some embodiments, when a void is created in a wall of a room, the process 1000 includes installing a transmission wire in the corresponding wall of an adjacent room.

Preparing a transmission wire can include stripping a portion of insulation near the end of the transmission wire located near the first void. In one example, the process 1000 includes stripping a 0.5 inch strip insulation from the end of the transmission wire. Stripping of the insulation may be required to adequately permit conductivity between the transmission wire and the metallic fixture. A length of heat-shrink tubing can sheathe the insulation-stripped end of the transmission wire. The length of heat-shrink tubing can slide up to the interface of the transmission wire and the metallic fixture and, following heating, secure the connection between the transmission wire and the metallic fixture.

At step 1018, the process 1000 includes feeding the transmission wire back into the first void and installing the metallic fixture to the first void. The metallic fixture can secure to the first void in a manner such that the face of the metallic fixture is substantially coplanar with the front surface of the target body 102. The metallic fixture can include threads or other fixation mechanisms that are engaged by inserting the metallic fixture into the first void and rotating the metallic fixture (or a portion thereof) with a suitable tool, such as a screwdriver.

At step 1021, the process 1000 includes connecting the lower end of the transmission wire to a touch controller 103. A portion of insulation at the lower end of the wire can be removed to enable conductivity between the transmission wire and the touch controller 103. As shown in FIG. 7, the insulation-stripped lower end connects to the touch controller 103 in a manner similar to the fixation of the insulation-stripped upper end to the metallic fixture. As will be understood by an individual of ordinary skill in the art, the transmission wire attaches to the touch controller 103 by any of the known methods, such as soldering, for forming secured electrical connections between wires and other electronic components. In some embodiments, a user tests the connection between the transmission wire and the touch controller 103 by touching the metallic fixture with a conductive probe, such as a finger. If the touch controller 103 registers the touch (e.g., measured as a voltage drop), the connection between the transmission wire and the touch controller 103 can be determined sufficient.

In at least one embodiment, following connection to the touch controller 103, the process 1000 includes reattaching a baseboard or other decorative feature to the target body 102 in a manner such the length of the transmission wire running from the second void to the touch controller 103 is substantially sheathed and/or hidden.

At step 1024, the process 1000 includes applying one or more conductive coatings (e.g., conductive paint) to the portion (or portions) of the target body 102 selected for conversion to the touch surface 101. Security dyes can be added to the conductive paint to enable visualization of the conductive paint coatings following the application of one or more secondary coatings that conceal the location and dimension of the touch surface 101. The coat can be applied in any two-dimensional shape or pattern. In at least one embodiment, the process 1000 includes waiting for a predetermined drying period before applying each subsequent coat of conductive paint. The face of the metallic fixture can receive multiple coats of conductive paint to ensure conductivity. Following the drying of the one or more coats, the touch surface 101 is formed thereon the portion of the target body 102. The process 1000 can include testing the touch surface 101 by touching the touch surface 101 with a conductive probe and confirming that the touch controller 103 registered the touch (e.g., by detecting a voltage drop).

At step 1027, the process 1000 includes applying one or more non-conductive coatings to the touch surface 101. In one example, the process 1000 includes coating the touch surface 101 with a primer. A primer coating may seal the touch surface 101 against moisture that would otherwise disrupt the functionality of the touch surface 101. In another example, following the application of primer coating, the process 1000 includes coating the touch surface 101 with drywall mud and waiting a predetermined time period to allow for drying. In the same example, following drying, the process 1000 includes sanding the drywall coating to provide a substantially smooth surface. The one or more drywall mud coatings can be allowed to dry and may then be lightly sanded. The process 1000 can include applying decorate paint to the touch surface 101 (e.g., following dry wall mud and/or primer coat application).

Because the touch surface 101 may be visually indistinguishable from other areas of the target body 102, the process 1000 can include applying coatings used for tracking the location and dimensions of the touch surface 101. For example, coatings including one or more security dyes (e.g., pigments visible under infrared light, ultraviolet light, or other light spectra) can be applied to outline a perimeter of a touch surface 101. In the same example, the applied coatings render the perimeter of the touch surface 101 visible under the corresponding lighting or imaging conditions. The touch system can track and digitize touch surface location and dimension based on the coatings, and the touch system can accurately and precisely project content onto the touch surface 101 based on digitized touch surface location and dimension.

In one example, the process 1000 includes coating a touch surface 101 with an infrared-reflective material. In the same example, an infrared imaging device detects the infrared-reflective material and the touch system maps the dimension and position of the touch surface 101 based on imaging data from the infrared imaging device. Continuing the example, the touch system uses the position and dimension as an input to an effect execution process, maps digital content onto the touch surface 101, and causes a projection source to project the digital content onto a target body 102 in areas corresponding to the location and dimension of the touch surface 101.

Another approach to tracking touch surface location and dimension includes capturing images of the touch surfaces 101 during fabrication and analyzing the images to generate data describing relative or absolute positions and sizes of the fabricated touch surfaces 101. For example, a projection source 109 oriented towards a target body 102 can include a camera that captures images of the touch surfaces 101 fabricated thereon. In the same example, following fabrication completion, the touch system uses the captured images as an input for generating and projecting content, such as colored shapes and outlines, onto the areas of the target body 102 that correspond to the locations and dimensions of the touch surfaces 101.

Another approach to tracking touch surface location and dimension includes maneuvering a metal-detecting apparatus across a target body 102 including fabricated touch surfaces 101. Because the conductive paint coatings of the touch surfaces 101 include a metallic material, positive readings from the metal-detecting apparatus can be associated with positioning thereof to map the positions of the touch surfaces 101 along the target body 102.

Another approach to tracking touch surface location and dimension includes precisely recording positions and sizes of touch surfaces 101 on a target body 102 prior to applying secondary coatings. In one example, surveying equipment is utilized to precisely and accurately measure the location and dimension of each touch surface 101 on a wall. In the same example, the location and dimension measurements can be used as an input to content generation and projection processes for visibly indicating the presence of touch surfaces 101 on the wall.

Figure 11:
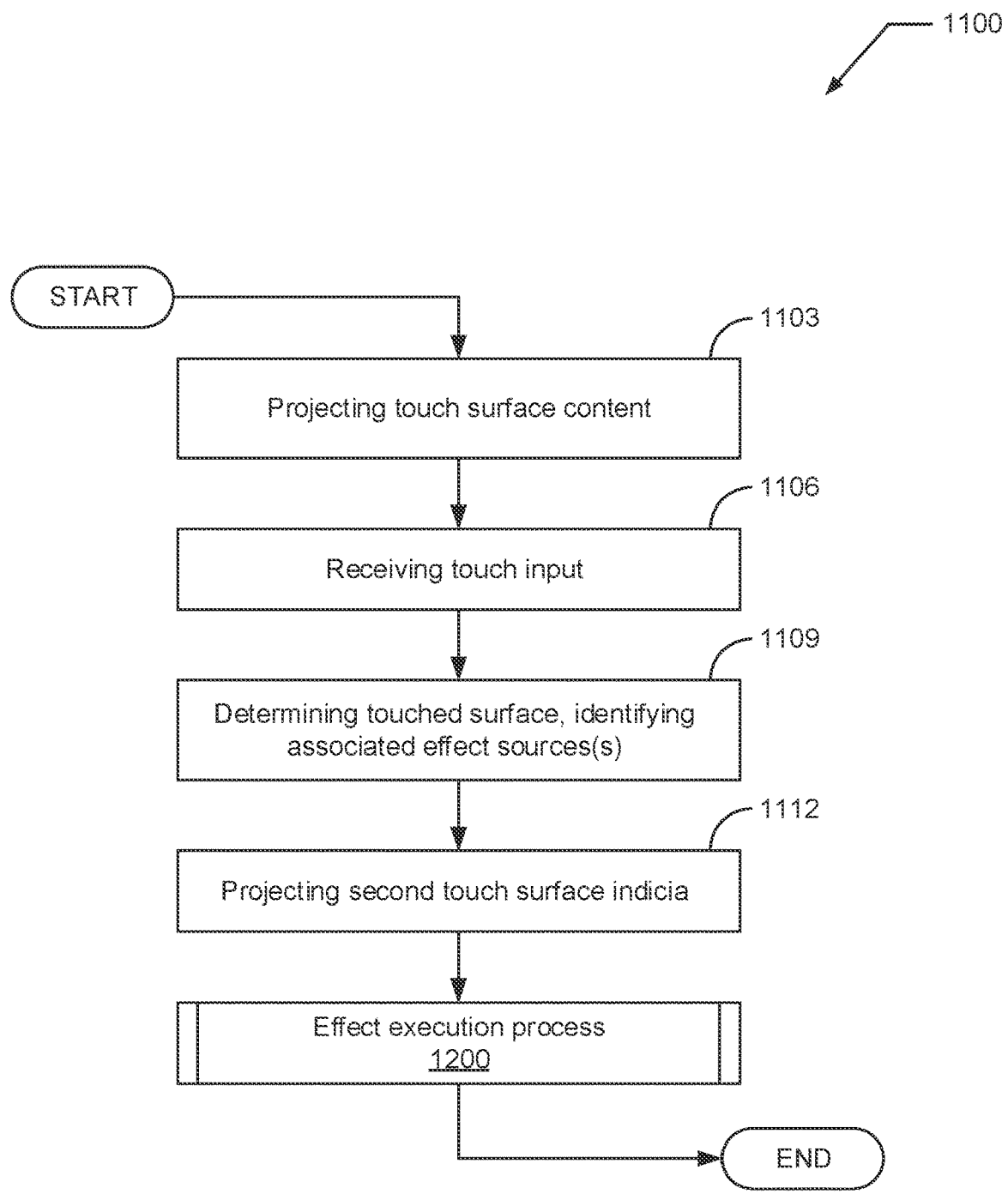
FIG. 11 shows an exemplary touch surface control process, according to one embodiment of the present disclosure.

FIG. 11 shows an exemplary touch surface control process 1100.

At step 1103, the process 1100 includes projecting content onto a target body 102. The projected content can include shapes sized to conform to perimeters of touch surfaces 101 located on the target body 102. The projected content can include visual elements for stimulating interaction or facilitating a play experience (e.g., also referred to as an "interactive event"). For example, the projected content includes virtual game pieces for use in a board game that a subject plays by providing input to various touch surfaces. An effect controller 211 can generate a projection command based on touch surface data 213 including, but not limited to, information identifying the positions and dimensions of the touch surfaces 101 on the target body 102. A projection source 109 can receive the projection command and the projection command can cause the projections source 109 to project the projected content.

The data manager 209 can update touch surface data 213 associated with each of the touch surfaces 101 to indicate that the touch surfaces 101 are currently visible on the target body 102 (e.g., due to the presence of projected content outlining the touch surfaces 101). Based on the touch surface data 213, the operational application 203 can update a graphical user interface (GUI) rendered on the control display 204 to include a list, table, or other graphic indicating the currently visible touch surfaces 101. The operational application 203 can further update the GUI based on touch surface data 213 and/or effect data 215 to include graphics indicating the one or more effects and effect criteria associated with each of the touch surfaces 101. As will be understood by one of ordinary skill in the art, the processes of retrieving and parsing data associated with the touch surfaces 101 can be organized based on the stored touch surface and effect source identifiers.

At step 1106, the process 1100 includes receiving touch input. In some embodiments, receiving the touch input includes determining states of multiplexers or pins thereof. Receiving touch input can include parsing an identifier. Receiving touch input can include performing digital signal processing and/or calibration techniques to obtain an electrical signal reading for each touch surface 101. In one example, the touch system 100 performs a de-multiplexing process to read a voltage value from each touch surface 101. A touch surface 101 can receive touch input upon a subject touching the touch surface 101. The touch input can be detected by a connected touch controller 103. The touch controller 103 can retrieve an identifier associated with the touch surface 101. The touch controller 103 can generate a transmission including the identifier and a second identifier associated with the touch controller 103. The touch controller 103 can transmit the transmission to the operational application 203. The data manager 209 can parse the transmission to obtain the touch surface and touch controller identifiers. The transmissions can include touch surface identifiers and include timestamps indicative of when the touch input was received. The data manager 209 can update counter data 217 and/or threshold data 219 to track the number and frequency of touch inputs to the touch surface 101.

At step 1109, the process 1100 includes determining a touch surface 101 that received the touch input. Determining the touch surface 101 can include analyzing voltage delta for each touch surface, for example, by computing a voltage value for each touch surface 101 of a touch-receptive region 104 and identifying a touch surface 101 that experienced a maximum and/or threshold-exceeding voltage delta. Determining the touch surface 101 can include processing an identifier and determining one or more associated effect sources 207. Based on the touch surface identifier, a processor of the operational application 203, in coordination with the data manager 209, can determine the touch surface 101 that received the touch input and update corresponding touch surface data 213 to indicate the received touch input activity. The data manager 209 can update one or more counters by modifying counter data 217 associated with the touch surface identifier and/or the touch controller identifier. Based on the associated touch surface data 213, an effect controller 211 can determine one or more preprogrammed effects associated with the touch surface 101.

Determining the touch surface can include generating a touch event. As used herein, a touch event generally refers to a data object and metadata describing an instance of touch input. A touch controller 103 can detect a voltage change in response to a change in dielectric properties at a touch surface 101. The touch controller 103 can generate a touch event including an identifier of the touch surface 101 and metadata. Non-limiting examples of metadata include touch duration, touch frequency, and voltage delta. The touch controller 103 can transmit the touch event to the computing environment 200. In some embodiments, determination of touch input and/or determination of touch surfaces occurs at the operational computing environment 201. In one example, the controller 103 transmits a status (e.g., an electrical signal value) of each touch surface 101 to the operational computing environment 201 in virtually real-time, and the operational computing environment 201 processes and analyses the statuses to detect touch inputs.

In some embodiments, a processor of the operational application 203 determines the one or more preprogrammed effects and one or more effect sources 207 associated therewith. The touch system 100 can leverage a publish-subscribe-based communication scheme for controlling the effect sources 207 controlled regardless of which particular effect controller 211 coordinates the control. In one example, the publish-subscribe-based communication scheme includes a message queuing telemetry transport (MQTT) technique, or the like.

At step 1112, the process 1100 includes projecting second touch surface indicia. The effect controller 211 can automatically generate and transmit a projection command to a projection source 109. The projection command can include instructions for projected content that visually indicates receipt of the touch input. The projection command can cause the projection source 109 to update content being projected onto the touch surface 101 that received the touch input. The projection command can include a position to which the projection source 109 moves. For example, the touch system 100 can receive touch input from a touch surface 101 on a climbable structure. In this example, the touch system 100 can determine that a subject is climbing on the climbable structure (e.g., a stationary structure) and can generate a projection command including position data for orienting a projection source 109 toward the touch surface 101. It will be understood by one of ordinary skill in the art that the process of receiving touch input at the touch surface 101 and causing a projection source 109 to update projected content occurs at sufficient rates so as to appear to have occurred instantaneously to the subject that provided the touch input.

The update to the projected content can include, for example, changing one or more projected content colors or content dimensions. In one example, the projected content includes movement of a virtual game piece based on the touch input. In another example, the projected content includes a digital avatar of a subject that provided touch input. The projected content can include indications for a next step of an interactive event. For example, the projected content visually indicates a second touch surface 101 to which a subject may provide input to advance through an interactive event. The computing environment 200 can track a current state of an interactive event and generate commands (e.g., projected content and other effect commands) based on the current state.

In various embodiments, following steps performed at step 1109 and/or step 1112, the process 1100 includes performing an effect execution process 1200 as described herein.

Figure 12:
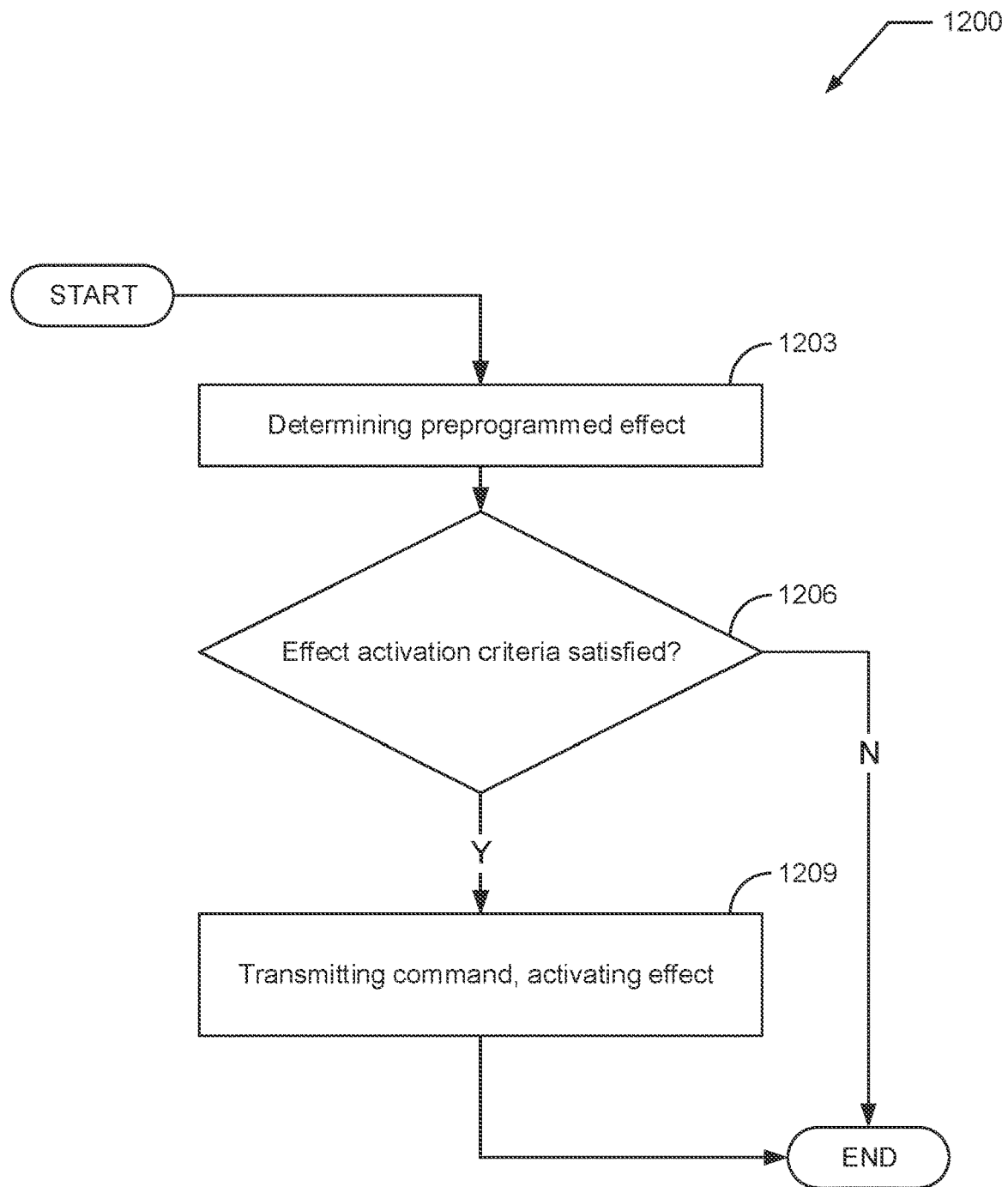
FIG. 12 shows an exemplary effect execution process, according to one embodiment of the present disclosure.

FIG. 12 shows an exemplary effect execution process 1200. At step 1203, the process 1200 includes determining one or more preprogrammed effects. An effect controller 211 can determine the preprogrammed effect based on an identifier (e.g., a touch surface identifier). An effect controller 111 can retrieve touch surface data 213 associated with the identifier and can determine the one or more preprogrammed effects based on the touch surface data 213. The touch surface data 213 can include one or more effect identifiers, each of the one or more effect identifiers being associated with a preprogrammed effect. Based on the one or more effect identifiers associated with the touch surface 101 identifier, the effect controller can retrieve corresponding effect data 215 that includes information associated with the one or more preprogrammed effects.

At step 1206, the process 1200 includes determining that effect activation criteria are satisfied. For each preprogrammed effect identified at step 1203, the effect controller 211 can analyze touch surface data 213, effect data 215, counter data 217, and/or threshold data 219 to determine satisfaction of associated effect activation criteria. The effect data 215 of each of the one or more preprogrammed effects can include activation criteria. The activation criteria can include configurable, predetermined activation values for counters and/or thresholds (e.g., that are stored and updated as counter data 217 and threshold data 219). For each of the one or more preprogrammed effects, the effect controller 211 can determine satisfaction of each of the activation criteria based on, for example, comparing the predetermined activation values to the current corresponding counter data 217 and threshold data 219.

Activation criteria can include receiving (and/or not receiving) touch input from two or more touch surfaces 101. For example, the touch system 100 can trigger an effect based on determining that two touch surfaces received touch inputs substantially simultaneously. In another example, the touch system 100 triggers an effect based on determining that a first touch surface received a touch input and a second touch surface did not receive a touch input within a predetermined time period of the touch input at the first touch surface. Activation criteria can include frequency of touch input and/or repetition of touch input (e.g., within a predetermined time period). For example, the touch system 100 triggers an effect based on determining that a touch surface 101 received ten instances (e.g., or any other number) of touch inputs within a predetermined time period of about ten seconds (e.g., or any other time period).

Activation criteria can include determining that a predetermined amount of time passed since last-detecting a touch input (e.g., to the same touch surface 101 or one or more other touch surfaces 101) and/or determining that a predetermined amount of time passed since the last execution of a preprogrammed effect. Activation criteria can include determining that an identity of a subject or object that provided the touch input possesses privileges for causing effect generation. In one example, when a subject provides touch input to a touch surface 101, the touch system 100 reads an identifier from an article of the subject (e.g., an identifier from an RFID bracelet). In the same example, the touch system 100 retrieves information on the subject based on the identifier and determines that a user account with which the identifier is associated has been granted access to effect execution experiences (e.g., for the touch surface 101 that received the touch input or for all touch surfaces of the touch system 100). Activation criteria can include determining the presence of effect-activating or effect-suspending inputs. In one example, the activation criteria includes determining whether an RFID-triggering toy was placed (or not placed) on an RFID-reading surface when the touch surface received touch input. In another example, the activation criteria includes determining whether particular content was being projected (or not projected) when the touch surface received touch input.

Upon determining that the activation criteria are satisfied, the process proceeds to step 1209. In some embodiments, the process proceeds to step 1209 if activation criteria for at least one of the one or more preprogrammed effects are satisfied. Upon determining that one or more of the activation criteria are not satisfied, the process 1200 can suspend. According to one embodiment, upon determining the dissatisfaction of one or more of the activation criteria, the effect controller 211 can transmit a command to a projection source 109 that causes the projection source 109 to project updated content onto the corresponding touch surface 101 indicating one or more effect criteria determined to be dissatisfied.

The touch system 100 can analyze voltage drop magnitudes (e.g., or other touch input-associated data) to estimate a quantity of subjects in contact with a touch surface 101 or touch region 104. For example, the touch system 100 determines that touch input is associated with two subjects at the same touch surface 101 by determining that a voltage change exceeds a predetermined threshold (e.g., voltage changes in excess of a range associated with touch input from a single subject). The touch system 100 can trigger various effects depending on a quantity of subjects that provided touch input. In one example, the touch system 100 initiates an effect while a touch surface 101 receives touch input from a subject and suspends the effect when the touch surface 101 receives a second, simultaneous touch input form a second subject. The touch system 100 can initiate an effect when a first touch surface 101 and a second touch surface 101 receive touch input within a predetermined time period (e.g., five seconds, ten seconds, one minute, etc.). In one, the touch system 100 generates an effect in response to receiving touch events for a first touch surface 101 and a second touch surface 101 within a one-minute time period. The touch system 100 can cause projection of first content in response to a touch event at the first touch surface 101, and the touch system can cause projection of secondary content (e.g., modifying or updating the first content) in response to a touch event at the second touch surface 101.

At step 1209, the process includes transmitting one or more effect commands to one or more effect sources 207. In one example, the effect controller 211 generates an effect command based on a preprogrammed effect for flashing red lights. In the same example, the effect controller 211 transmits the effect command to a light source 221, and the effect command causes the light source 221 to flicker a set of red light-emitting diodes or activate a red light filter while flickering a light-emitting element. In another example, the effect controller 211 commands an audio source 223 to emit an audible prompt for advancing a touch-based interactive event. In another example, the effect controller 211 commands a projection source 109 to update projected content such that a virtual game piece moves in (or opposite) a direction corresponding to the position of the touch surface 101 that received touch input.

CONCLUSION

Aspects, features, and benefits of the systems, methods, processes, formulations, apparatuses, and products discussed herein will become apparent from the information disclosed in the exhibits and the other applications as incorporated by reference. Variations and modifications to the disclosed systems and methods may be effected without departing from the spirit and scope of the novel concepts of the disclosure.

It will, nevertheless, be understood that no limitation of the scope of the disclosure is intended by the information disclosed in the exhibits or the applications incorporated by reference; any alterations and further modifications of the described or illustrated embodiments, and any further applications of the principles of the disclosure as illustrated therein are contemplated as would normally occur to one skilled in the art to which the disclosure relates.

The foregoing description of the exemplary embodiments has been presented only for the purposes of illustration and description and is not intended to be exhaustive or to limit the systems and methods to the precise forms disclosed. Many modifications and variations are possible in light of the above teaching.

The embodiments were chosen and described in order to explain the principles of the systems and methods and their practical application so as to enable others skilled in the art to utilize the systems and methods and various embodiments and with various modifications as are suited to the particular use contemplated. Alternative embodiments will become apparent to those skilled in the art to which the present systems and methods pertain without departing from their spirit and scope. Accordingly, the scope of the present systems and methods is defined by the appended claims rather than the foregoing description and the exemplary embodiments described therein.

From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media that can be accessed by a computer or downloadable through communication networks. By way of example, and not limitation, such computer-readable media can comprise various forms of data storage devices or media such as RAM, ROM, flash memory, EEPROM, CD-ROM, DVD, or other optical disk storage, magnetic disk storage, solid-state drives (SSDs) or other data storage devices, any type of removable non-volatile memories such as secure digital (SD), flash memory, memory stick, etc., or any other medium which can be used to carry or store computer program code in the form of computer-executable instructions or data structures and which can be accessed by a computer.

When information is transferred or provided over a network or another communications connection (either hardwired, wireless, or a combination of hardwired or wireless) to a computer, the computer properly views the connection as a computer-readable medium. Thus, any such a connection is properly termed and considered a computer-readable medium. Combinations of the above should also be included within the scope of computer-readable media. Computer-executable instructions comprise, for example, instructions and data which cause a computer to perform one specific function or a group of functions.

Those skilled in the art will understand the features and aspects of a suitable computing environment in which aspects of the disclosure may be implemented. Although not required, some of the embodiments of the claimed systems and methods may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multi-processor systems, microprocessor-based or programmable consumer electronics, networked PCs, minicomputers, mainframe computers, and the like. Embodiments of the claimed systems and methods are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that affects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the systems and methods are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the systems and methods are connected to the local network through a network interface or adapter. When used in a WAN or WLAN networking environment, the computer may include a modem, a wireless link, or other mechanisms for establishing communications over the wide-area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed systems and methods will be readily discernible from the description herein, by those of ordinary skill in the art. Many embodiments and adaptations of the disclosure and claimed systems and methods other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed systems and methods. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed systems and methods. In addition, some steps may be carried out simultaneously, contemporaneously, or in synchronization with other steps.

The embodiments were chosen and described in order to explain the principles of the claimed systems and methods and their practical application so as to enable others skilled in the art to utilize the systems and methods and various embodiments and with various modifications as are suited to the particular use contemplated. Alternative embodiments will become apparent to those skilled in the art to which the claimed systems and methods pertain without departing from their spirit and scope. Accordingly, the scope of the claimed systems and methods is defined by the appended claims rather than the foregoing description and the exemplary embodiments described therein.

What is claimed is:

1. A touch-capacitive surface system in a play environment, comprising:
a plurality of touch surfaces positioned along a target body, wherein:
each of the plurality of touch surfaces comprises:
a conductive drywall anchor secured to the target body; and
a capacitive surface comprising a conductive coating, wherein the conductive coating substantially covers the conductive drywall anchor; and
the target body comprises a stationary structure in the play environment;
a touch controller electrically coupled to the conductive drywall anchor of the plurality of touch surfaces, wherein the touch controller is configured to detect a touch from a particular touch surface of the plurality of touch surfaces;
a projection source; and
at least one computing device in communication with the touch controller and the projection source, the at least one computing device being configured to generate, via the projection source, projected content at least partially onto the target body in response to the touch controller detecting the touch from the particular touch surface.

2. The touch-capacitive surface system of claim 1, wherein the at least one computing device is further configured to detect a person climbed on the stationary structure in the play environment based on detecting the touch.

3. The touch-capacitive surface system of claim 1, wherein the target body comprises a wall, and the plurality of touch surfaces are positioned in a grid pattern on the wall.

4. The touch-capacitive surface system of claim 3, wherein the particular touch surface comprises:
a drywall anchor electrically coupled to the touch controller;
a conductive paint coupled to the drywall anchor; and
a non-conductive material covering the conductive paint.

5. The touch-capacitive surface system of claim 3, wherein the plurality of touch surfaces comprises a grid of sheets positioned adjacent each other on the wall, wherein each sheet of the grid of sheets comprises a conductive layer configured to form at least a subset of the plurality of touch surfaces.

6. The touch-capacitive surface of system of claim 1, further comprising an RFID reader located in or nearby at least one of the touch surfaces for identifying an RFID tag in the play environment.

7. The touch-capacitive surface of system of claim 1, wherein the touch controller is configured to sense at least two different voltage drop magnitudes at the capacitive surface of at least one touch surface.

8. The touch-capacitive surface of system of claim 7, wherein the touch controller is configured to sense at least a voltage drop associated with bare human hand and a voltage drop associated with an object other than a bare human hand.

9. A method for controlling a play environment, comprising:
providing, via a touch controller, a respective electrical signal to each of a plurality of touch surfaces on a target body comprising a stationary structure in the play environment, wherein:
each of the plurality of touch surfaces comprise a conductive coating and a conductive drywall anchor secured to the target body;
the conductive coating substantially covers the conductive drywall anchor; and
the touch controller is electrically coupled to the conductive drywall anchor of the plurality of touch surfaces;
detecting, via at least one computing device in communication with the touch controller, a touch event on at least one touch surface of the plurality of touch surfaces of the stationary structure based on a change in the respective electrical signal in the conductive coating; and
generating, via a projection source, a change to the play environment based at least in part on the touch event.

10. The method of claim 9, further comprising:
generating an interactive virtual game piece on one of the plurality of touch surfaces;
determining that the touch event on the at least one touch surface corresponds to an interactive virtual game piece, wherein the change to the play environment is further based on the touch event corresponding to the interactive virtual game piece.

11. The method of claim 9, wherein the change to the play environment is based on a current state of an interactive event.

12. The method of claim 11, wherein changing the play environment comprises rendering an indication for a next step in the interactive event.

13. The method of claim 9, further comprising generating the plurality of touch surfaces by:
inserting a plurality of anchors into the target body;
electrically coupling the plurality of anchors to the touch controller;
applying a conductive paint to the target body to form a plurality of conductive portions; and
covering the conductive paint with a non-conductive material.

14. The method of claim 9, further comprising:
printing, via a cutting machine, a plurality of sheets of conductive material; and
affixing the plurality of sheets of conductive material to the target body to form the plurality of touch surfaces.

15. The method of claim 14, further comprising:
affixing a plurality of leads to each of the plurality of sheets of conductive material; and
affixing the plurality of leads to a multiplexer coupled to the touch controller.

16. The method of claim 9, further comprising identifying an RFID tag in the play environment with an RFID reader.

17. The method of claim 16, further comprising sensing at least a voltage drop magnitude associated with bare human hand and a voltage drop magnitude associated with an object other than a bare human hand.

18. The method of claim 9, further comprising sensing at least two different voltage drop magnitudes in the electrical signal of at least one touch surface.

* * * * *

UNITED STATES PATENT AND TRADEMARK OFFICE
CERTIFICATE OF CORRECTION

| | |
|---|---|
| PATENT NO. | : 11,755,158 B2 |
| APPLICATION NO. | : 17/199035 |
| DATED | : September 12, 2023 |
| INVENTOR(S) | : Nathaniel McFarland |

It is certified that error appears in the above-identified patent and that said Letters Patent is hereby corrected as shown below:

In the Claims

In Column 27, Line 46, Claim 6, delete "surface of system" and insert -- surface system --, therefor.

In Column 27, Line 50, Claim 7, delete "surface of system" and insert -- surface system --, therefor.

In Column 27, Line 54, Claim 8, delete "surface of system" and insert -- surface system --, therefor.

Signed and Sealed this
Twenty-first Day of May, 2024

Katherine Kelly Vidal
*Director of the United States Patent and Trademark Office*